(12) United States Patent
Uppalapati

(10) Patent No.: US 10,375,054 B2
(45) Date of Patent: Aug. 6, 2019

(54) SECURING USER-ACCESSED APPLICATIONS IN A DISTRIBUTED COMPUTING ENVIRONMENT

(71) Applicant: NETFLIX, INC., Los Gatos, CA (US)

(72) Inventor: Raju Uppalapati, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 15/584,453

(22) Filed: May 2, 2017

(65) Prior Publication Data

US 2017/0237729 A1 Aug. 17, 2017

Related U.S. Application Data

(63) Continuation-in-part of application No. 14/876,629, filed on Oct. 6, 2015, now Pat. No. 9,825,956.

(51) Int. Cl.
*H04L 29/06* (2006.01)
*G06F 16/957* (2019.01)
*H04L 29/08* (2006.01)

(52) U.S. Cl.
CPC ...... *H04L 63/0815* (2013.01); *G06F 16/9574* (2019.01); *H04L 63/10* (2013.01); *H04L 63/101* (2013.01); *H04L 63/105* (2013.01); *H04L 63/20* (2013.01); *H04L 67/10* (2013.01); *H04L 67/306* (2013.01)

(58) Field of Classification Search
CPC .................................................. H04L 63/0815
See application file for complete search history.

(56) References Cited

U.S. PATENT DOCUMENTS

| 5,068,782 | A | * | 11/1991 | Scheuneman | G06F 9/468 711/103 |
| 5,428,803 | A | * | 6/1995 | Chen | G06F 1/10 712/29 |
| 6,092,155 | A | * | 7/2000 | Olnowich | G06F 12/0817 709/200 |
| 6,553,464 | B1 | * | 4/2003 | Kamvysselis | H04L 29/06 709/217 |
| 6,715,082 | B1 | * | 3/2004 | Chang | G06F 21/34 713/160 |
| 7,072,984 | B1 | * | 7/2006 | Polonsky | H04L 67/2823 709/246 |
| 7,437,362 | B1 | | 10/2008 | Ben-Natan | |

(Continued)

*Primary Examiner* — Shawnchoy Rahman
(74) *Attorney, Agent, or Firm* — FisherBroyles, LLP

(57) ABSTRACT

Provided herein are systems and methods of controlling access to a web-based application. Such a system may include an access determination server, an authorization control system, and a first web-based application accessible over a network to a first user device of a first user. The processing device of the access determination server receives application request information from the authorization control system, the application request information including an identifier of the first web-based application and an identifier of the first user, determines an access response based on the application request information and access information feed, transmits the access response to the authorization control system, receives an access result from the authorization control system, the access result being based on a response from a second user device to a notification, and stores the access result in an access information feed system.

19 Claims, 14 Drawing Sheets

(56) References Cited

U.S. PATENT DOCUMENTS

| | | | |
|---|---|---|---|
| 7,516,285 | B1 | 4/2009 | Haynes et al. |
| 8,051,491 | B1 | 11/2011 | Cavage et al. |
| 9,009,111 | B2 | 4/2015 | Vermeulen et al. |
| 9,239,912 | B1 * | 1/2016 | Dorwin ............... G06F 21/6209 |
| 2005/0262132 | A1 | 11/2005 | Morita et al. |
| 2008/0091978 | A1 | 4/2008 | Brodsky et al. |
| 2008/0243869 | A1 * | 10/2008 | Choi .................. H04L 12/2832 |
| 2008/0313721 | A1 * | 12/2008 | Corella .................. G06F 21/31 726/6 |
| 2012/0226712 | A1 | 9/2012 | Vermeulen et al. |
| 2014/0189880 | A1 | 7/2014 | Funk |
| 2015/0081918 | A1 | 3/2015 | Nowack et al. |
| 2015/0244684 | A1 * | 8/2015 | Ng .......................... H04L 67/10 713/168 |
| 2016/0197915 | A1 * | 7/2016 | Bicer ..................... H04L 63/08 726/7 |

\* cited by examiner

SECURING USER-ACCESSED APPLICATIONS IN A DISTRIBUTED COMPUTING ENVIRONMENT

PRIORITY DATA

This application is a continuation-in-part of prior application Ser. No. 14/876,629, filed on Oct. 6, 2015, entitled "Systems and Methods for Access Permission Revocation and Reinstatement," the disclosure of which is incorporated herein in its entirety by reference.

TECHNICAL FIELD

The present disclosure relates generally to the management of access permissions associated with applications accessible in a networked environment. Specifically, the disclosure relates to the management of access permissions relating to user access to applications in a distributed computing environment.

BACKGROUND

Increasingly, information is stored and accessed via remote computing devices. Local computing devices, such as a client device, can be used to access and interact with remote computing devices to retrieve information such as the documents, videos, images, applications, and others. These remote computing devices may also interact with local computing devices to deploy applications coded on the local computing devices into clusters of remote computing devices, such as a distributed computing environment, commonly referred to as "a cloud" or "the cloud."

Some of the information that is remotely accessed is information that is sensitive in some regard. For example, the information may include sensitive personal or financial information or may include information protected by copyright or other legal structures. Authorizing one set of users to access one set of information while denying access to another set or other sets of information is an area in which progress has been made over the years.

However, the increasing reliance and utilization of distributed computing environments has complicated the provisioning of access to information, resources, and functions to those entities that should be authorized to access that information, those resources, and those functions. Accordingly, current approaches to providing access permissions within distributed computing environments have not been entirely satisfactory.

Figure 1:
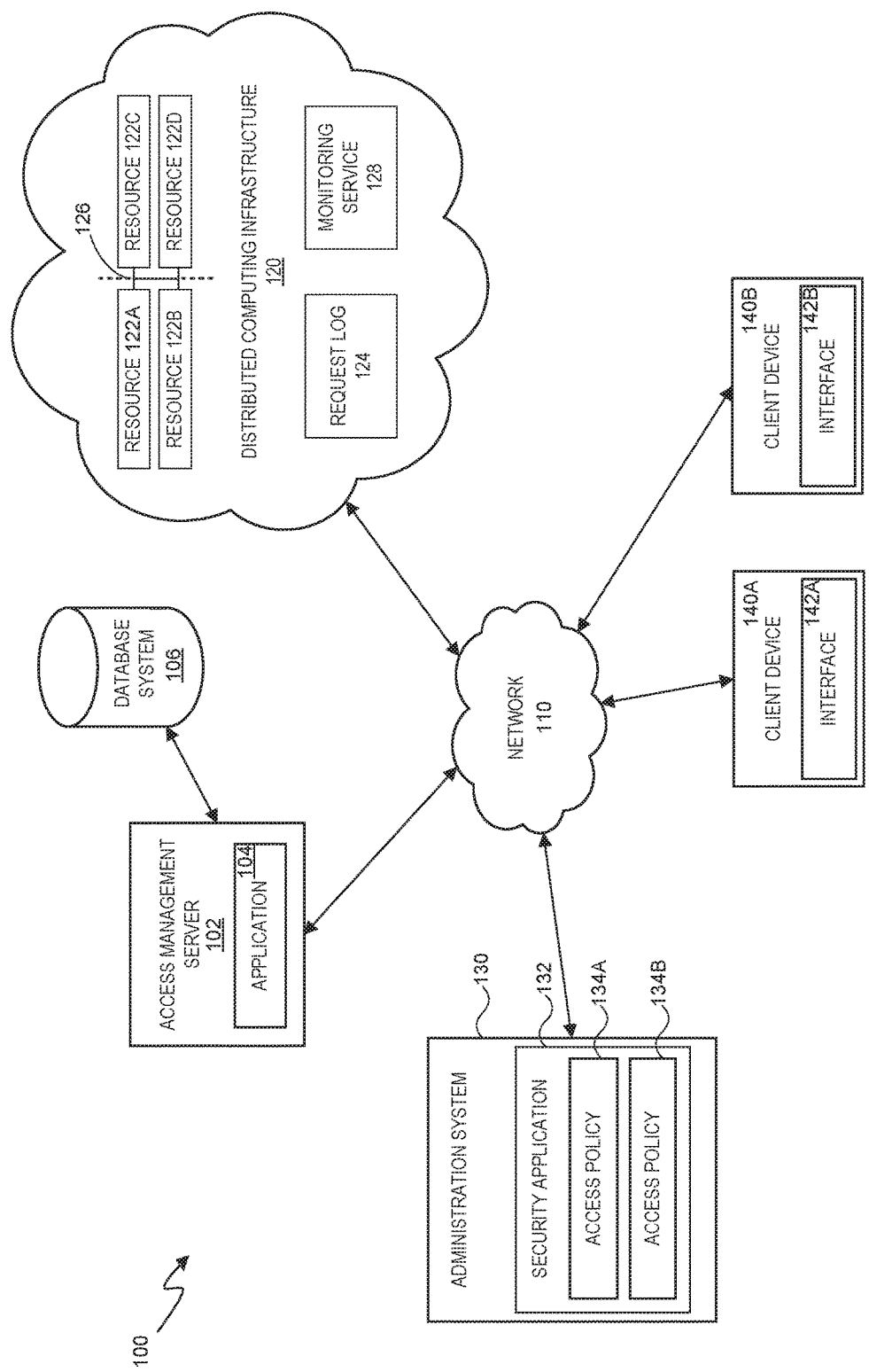
FIG. 1 is a block diagram of access management system including an access management server that may grant, revoke, and reinstate access, according to some aspects of the present disclosure.

These drawings will be better understood by those of ordinary skill in the art by reference to the following detailed description.

DETAILED DESCRIPTION

With references to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, some well-known process steps have not been described in specific detail in order to avoid unnecessarily obscuring the present disclosure. Additionally, other applications of the concepts and principles described herein are possible, such that the following examples should not be taken as limiting. For example, while many of the examples disclosed herein are directed to the detection and management of API access in the context of a streaming video service, the principles and concepts described may be applied to provide more generally for the revocation, reinstatement, and request of API access for a plurality of applications deployed at scale.

In the following detailed description, references are made to the accompanying drawings, which form a part of the description and in which are shown, by way of illustration, some specific embodiments of the present disclosure. Although these embodiments are described in sufficient detail to enable one skilled in the art to practice the invention, it is understood that these embodiments are not limiting, such that other embodiments may be used, and changes may be made without departing from the spirit and scope of the invention. For example, changes within the scope of this disclosure may include performing an operation on a different system or device, etc.

Devices, systems, and methods are provided for managing access permissions in a distributed computing environment. Managing access permissions may include granting access, revoking access, and reinstating access after revocation. The access permissions may provide or deny access to a plurality of objects accessible within or from the distributed computing environment. Access to an object may include access to make calls on specific application programming interfaces (APIs) presented or exposed by distributed computing infrastructure.

As a non-limiting example, reference may be made here in to Amazon Web Services (AWS) as an example of a distributed computing infrastructure or cloud computing infrastructure. The distributed computing infrastructure may provide resources for computing as well as for storage, networking, and other functions or services provided by collections of remote computing devices. For example, the distributed computing infrastructure may include scalable storage, virtual servers and virtual networks, databases, analytics services, application services (e.g., email, push notification, workflow services) and application deployment and management services.

As part of the application deployment and management services, the distributed computing infrastructure may provide user activity logging. This activity logging may include a log of requests made by resources or resource instances associated with one or more accounts of a consumer or customer of the distributed computing infrastructure. For example, AWS includes a service referred to as CLOUD-TRAIL™. CLOUDTRAIL™ is an example of a distributed computing service that records API calls within the AWS environment and delivers a log to a device operated by the consumer. Comparable API call logs may be provided in other distributed computing infrastructure embodiments. The log may include information identifying the caller of the API, the time of the call, the source IP address of the caller, the parameters included in the call, and response elements such as error messages resulting from the call. In some embodiments, a region of the distributed computing infrastructure in which the API call originated may also be specified in the log. In general the application deployment and management services may provide such information to and access management service operated by the consumer of distributed computing services.

A consumer of distributed computing services may have information regarding one or more applications deployed to the distributed computing infrastructure. Such information may include an access policy associated with the one or more applications. The access policy of a given application may indicate the permissions associated with that application. For example, an access policy may indicate or list APIs that an application is permitted to call within the distributed computing infrastructure. In general, the access management server may be provided with a set of permissions, e.g. an access policy, associated with any entity existing within the purview of the access management system. Such entities may include users having user accounts as well as individual applications. In some embodiments, each individual application may be handled in the system as if it were a user, having its own individual user account.

For example, AWS includes a service to provide AWS identity and access management (IAM). IAM provides services to manage users, which may be referred to as IAM users, as well as roles, referred to as IAM roles. IAM users or individual applications may be assigned an IAM role. The application may be provided by another service of the distributed computing infrastructure, such as another AWS service such as an Amazon Elastic Compute Cloud (EC2) instance or an Amazon Simple Storage Service (S3) instances, for example.

When an application deployed within the distributed computing infrastructure makes an API call in order to access another service or application operating within the distributed computing infrastructure, the request for access may be logged as well as responded to by the service or application at issue. When an error is detected, such as an error indicating that one or more parameters associated with the call is improper or an error indicating that access is denied, this error may also be logged in association with the request and with the associated application.

In order to provide for secure operating environment, it may be desirable that an application be provided with the access to other applications and services that it needs and be denied access to other applications and services that it does not need to serve its function. For example, an application may, at least temporarily, be provided with access to an API used in obtaining sensitive financial information, such as a credit card number, of a user of services provided by the customer of the distributed computing infrastructure via the distributed computing infrastructure. The access may be revoked if it is determined not to be necessary. In a first state, a new application may be provided with an access policy that includes access to more objects or other APIs then the application may be determined to need in the future. For example, the new application may have a scheduled rollout that includes additional services that are not operational upon initial deployment of the application. However, it is anticipated that the additional services will, in the future, rely on specific permissions, such as permissions to call a specific API. Given this situation, the new application may be deployed with an overly permissive access policy in view of the scheduled rollout.

The access management system may retrieve information from the request log indicating what information, files, or functions have been requested by the new application during a predetermined time or period of observation, such as two weeks or a month. If the access management system determines that the number of requests to access the information, files, or functions is below a threshold value or threshold number, the access management system may direct that the access policy associated with the new application be modified to remove access to the unused or underused information, files, or functions. In this way, even though the new application may be deployed with an overly permissive access policy, the access policy may be curtailed or modified to remove certain access. For example, if an application makes no calls to an API or makes fewer calls to an API than a predetermined threshold number of calls, the access policy associated with that application may be modified to remove access to the API.

As noted, when the first application is associated with a scheduled rollout of features or services, the features or services associated with the API to which access was removed may become operational after the removal of necessary access. The access management system may provide a user, such as a developer or any developer from a team of developers, with the ability to request reinstatement of access to the API that was removed from the access policy. For example, after one month of insufficient use of an API by a first application, the access management system may revoke or remove access to that API by the first application. One week later, the scheduled features that are to utilize the API may be ready to be deployed. A developer associated with the first application may request reinstatement of access to the API. The access management system may recognize that the original access policy included access to the API and may recognize that the access was revoked only one week before. The access management may determine from this information and/or other information that the access to the API should be restored or reinstated.

The access management system may automatically restore access to the API, without the intervention of any administrative security personnel.

Additionally, when the request logs indicate that an error is resulting frequently from a call made by a specific application, the access management system may revoke access to that call from an access policy associated with a specific application. The access management system may notify administrative security personnel and/or a developer or developer team associated with the specific application. This notification, which may be an email, a short message service (SMS) message, a push notification, or other such communication, may encourage corrective measures, such as a repair to the code or a replacement of the code, or another appropriate corrective measure.

In some embodiments of distributed computing infrastructure, in the event that the application continues to make calls resulting in errors, including access denied errors, the distributed computing infrastructure may throttle calls associated with the application. In some distributed computing infrastructures, such as AWS, other calls associated with the AWS account may also be throttled or rate limited even if those calls are not resulting in errors. Accordingly, the prevention of erroneous API calls on the part of a single application may improve performance, or prevent a degrading in performance, of all systems and services being provided in connection with a specific AWS account or other distributed computing infrastructure account.

The access management system may provide one or more user interfaces by which users such as developers and users such as administrative security personnel may access information associated with modifications to access policies associated with specific applications. For example, a user interface may provide a developer with interface elements that may be manipulated to request reinstatement of a revoked permission to call a specific API. Depending on the conditions associated with the request, the access management system may automatically reinstate access by automatically modifying the access policy associated with the specific application, or the access management system may send a communication to administrative security personnel requesting that the administrative security personnel determine whether or not access should be reinstated.

Other examples describing the components and the operations of access management system are provided herein. Combinations of these components and operations are within the scope of the present disclosure, including combinations specifically described and combinations that would be apparent to one of ordinary skill in the art based upon a careful reading of the present disclosure. Embodiments of the present disclosure may permit for automatic modification of access policies associated with applications deployed in a distributed computing infrastructure or environment.

Referring now to FIG. 1, shown therein is a block diagram of an access management system 100 that includes an access management server 102. As described herein, embodiments of the access management server 102 may include a processing device in communication with one or more storage systems or devices, which may store instructions for an access management application 104. The access management server 102 may be configured to receive information from a plurality of networked resources and, based on that information, modify an access policy associated with one or more applications deployed within a distributed computing environment. For example, the access management server 102 may be operated by Netflix, Inc. of Los Gatos, Calif., which may also operate systems for the creation of user accounts and for the streaming or other consumption of media content, such as movies, television shows, and other video-based and/or audio-based programming.

The access management server 102 is configured in communication with a database system 106 that may include information regarding entities existing within the purview of the access management server 102 and information regarding the requests for access to objects by those entities. Additionally, the database system 106 may include information describing access policies associated with those entities. As described herein, an entity may be a human user having a user account or a nonhuman user such as an application or service. The objects for which access is requested may be files, applications, services, APIs, or other digital objects present in the environment of the access management system 100. The database system 106 may include information obtained from other networked devices or systems included within the overall access management system 100.

For example, the access management server 102 may communicate over a network 110 with a distributed computing infrastructure 120, with an administration system 130, and with one or more client devices such as client devices 140A and 140B. As described, data communications between the access management server 102 and other components and devices illustrated in FIG. 1, may be transmitted over the network 110, which may include one or more networks such as a LAN, a WAN, a WWAN, a WLAN, a mobile telephone network, a landline telephone network, as well as other suitable networks. The network 110 may include a plurality of networks coupled together. As shown in FIG. 1, network 110 may include a private network, such that communication between the access management server 102 and the administration system 130 may not pass over publicly available communication lines or may be suitably encrypted for transit over the publicly available communication lines, while communication between the access management server 102 and the distributed computing infrastructure 120 may pass over publicly available communication lines. Accordingly, the network 110 may include both a private network, including a virtual private network (VPN), and a public network.

As noted, FIG. 1 illustrates that the access management server 102 communicates with the distributed computing infrastructure 120 over network 110. The distributed computing infrastructure 120 may include a plurality of servers and storage devices configured to provide a plurality of resource instances 122A, 122B, 122C, and 122D. A commercially available example of an appropriate distributed computing infrastructure 120 may be or be similar to the distributed computing infrastructure provided by Amazon Web Services, Inc. (AWS). In an embodiment in which the distributed computing infrastructure 120 is AWS, the resource instances 122A-D include a plurality of Amazon EC2 instances, a plurality of database instances such as an Amazon RDS instance, and storage instances such as an Amazon S3 bucket, and each of instances 122A-D may be provided by a plurality of computing and/or storage devices. The operator of the access management server 102 may deploy a plurality of applications to the distributed computing infrastructure 120 such that the applications are executed on hardware owned by a third-party operator, such as AWS.

As illustrated in FIG. 1, the distributed computing infrastructure 120 includes a request log 124 which may be a log of access requests made to or within the distributed computing infrastructure 120. For example, a first application executing on resource instance 122A may request to access information stored on resource instance 122D. In some embodiments, the resource instance 122A may communicate with the resource instance 122D over a virtual network 126 provided by the distributed computing infrastructure 120. In order to request to access information stored on the resource instance 122D, the resource instance 122A may call a specific API. When the resource instance 122A calls the specific API, a monitoring service 128 operating within the distributed computing infrastructure 120 may detect the call and record associated information in the request log 124. The monitoring service 128 may provide application deployment and management services within the distributed computing infrastructure 120. The request log 124 may include text information and/or numerical information describing each API call associated with the account. The information associated with a particular API call may include an identifier of the user or role (or application having been assigned a role) that called the API, the API called, the time of the call, the source IP address of the caller, parameters included in the API call, and any responses returned including error messages such as an access denied error.

The information in the request log 124 may be obtained upon request by the access management server 102. In some embodiments, the access management server 102 may be configured to automatically duplicate the request log 124 in the database system 106. The monitoring service 128 may be configured to update the request log 124 according to a schedule, e.g. every 15 minutes, every half hour, or every hour. The access management server 102 may access and duplicate the contents of the request log 124 on the same schedule or on a different schedule.

The administration system 130, which may be operated by the operator of the access management server 102, includes a security application 132 executing thereon. The security application 132 includes a plurality of access policies, illustrated as access policies 134A and 134B. Each of the access policies 134A and 134B may be associated with a specific entity, such as a specific user or a specific application. For example, the access policy 134A may be associated with a first application deployed within the distributed computing infrastructure 120. The access policy may indicate a list of objects that the application may access. For example, the access policy 134A may list a plurality of APIs that the first application has permission to call. In some embodiments, the access policies 134A and 134B may describe levels of access or categories of access that can be translated by an intermediary to determine whether the associated user or application should be provided with access to a specific object. The security application 132 may communicate with the distributed computing infrastructure 120 to determine access policies present within the distributed computing infrastructure 120 and may copy those access policies to provide the access policies 134A and 134B. In some embodiments, a copy of the access policies 134A and 134B is included in the database system 106 to be more readily accessible to the access management server 102 and the access management application 104 running thereon. The security application 132 may operate continuously and collect a log of access information to generate the access policies 134A and 134B.

The access management server 102 may access information, which may be stored in the request log 124, the access policies 134A and 134B, and/or in the database system 106 and determine that access to a first object by a first entity should be removed. This determination may be based on usage, such as a count of times that the first entity accesses the first object during a predetermined time or a period of observation. When the count is less than a threshold value, the access management server 102 may cause a modification to the access policy associated with the first entity that removes or curtails access to the first object. For example, the access management server 102 may determine that a first application has not accessed a first API during a period of observation. The access management server 102 may cause the access policy associated with the first application to be modified to omit or remove access to call the first API. Alternatively, the access management server 102 may determine that the first application called the first API fewer than 30 or 40 times (or another threshold value) during the period of observation. In some embodiments, the access management server 102 uses a threshold value of zero, such that it determined whether the first application has called the first API or not during the period of observation.

The period of observation may be used as an alternative or as a second thresholding variable. If the first application calls the first API at all during the period of observation, then the access management server 102 may not modify the access policy of the first application. Accordingly, the period of observation may be adjusted to a longer or a shorter time as desired. For example, the period of observation may be set to a day, a week, or a month. Additionally, the period of observation may be dependent on the particular API itself. During normal operation of services, a first API may be called more than a second API. In some embodiments, the access management server 102 may include a table of periods of observation, with a desired period of observation associated with each API. The access management server 102 may modify the access policy associated with the first application. In some embodiments, the access management server 102 may communicate with the security application 132 to modify the access policy associated with the first application.

In some embodiments, the determination that access by the first application to the first API should be removed includes determining from the request log that more than a threshold number of errors are being produced when the application calls the first API. For example, the access management server 102 may modify an access policy associated with the first application when the first application produces more than 5 or 10 errors during a period of observation in calls to the first API. Depending on the particular API, the threshold number of errors may be more than 100 or more than 1000 during the period of observation. The request log 124 may indicate in an error message the type of error being triggered by the call to the first API. The threshold value applied to determine whether or not access to the first API by the first application should be removed may depend on the type of error resulting from the API call. For example, when the request log 124 indicates that the first application provoked a "denied access" type error when calling the first API, the threshold value applied may be a lower threshold value, such as 5 to 10 calls. The access policy associated with the first application may be modified to prevent the first application from calling the first API and thereby triggering more errors. Additionally, the threshold value may depend on the API being called. For example, the distributed computing infrastructure 120 may allow for certain APIs to be called thousands of times a minute, while other APIs may only be called once per minute. The errors permitted for each API before throttling occurs may depend on the particular API. When a more than a threshold number of errors are triggered or more than a threshold number of allowable calls are made, the distributed computing infrastructure 120 may begin throttling responses to subsequent calls. The throttling may be applied to the first application as well as to other applications deployed within the distributed computing infrastructure 120. Accordingly, in some embodiments performance of all of the services associated with an account in the distributed computing infrastructure 120 may be improved by limiting API access of a single service or single application associated with the account.

Each application may be assigned a role or identity within the distributed computing infrastructure 120. For example, when the distributed computing infrastructure 120 is an AWS infrastructure, the applications may each be assigned to or deployed as an IAM role. Each IAM role contains an IAM policy, a document that explicitly defines permissions associated with the IAM role. To revoke an application's permission to call a particular API, the access management server 102 may communicate with the distributed computing infrastructure 120 to modify the IAM policy associated with the application, for example, by editing text of the IAM policy.

The access management server 102 may schedule modification of an access policy after the determination that the access policy should be modified. For example, the access management server may schedule modification of an access policy associated with a first application for one day or one week after either the application calls a specific API more than the threshold number of times during the period of observation for that API or the application's calls to the specific API result in more than a threshold number of errors during a period of observation. In some embodiments, the access management server 102 may provide administrative security personnel with a user interface in which to set a default scheduling of modifications.

When the access management server 102 determines that access to a first object by a first entity should be revoked or removed, the access management server 102 may produce and transmit a communication to administrative security personnel. The communication or a similar communication may also be transmitted to the first entity, which may be a first user or one or more users associated with a first application. When the entity is an application deployed within the distributed computing infrastructure 120, the access management server 102 may send a communication to the responsible for the application, who may be a lead developer. In some embodiments, the access management server 102 may send the communication to every developer associated with the application. By providing notification of a scheduled change in access, before the change is to occur, a developer or administrative security personal may have the opportunity to review the scheduled change and modify, cancel, or request cancellation of the scheduled change.

The communication generated and transmitted by the access management server 102 may include an email, an SMS message, push notification, or any other suitable type of electronic communication that may be conveyed from one computing device to another computing device. The communication may be received on one of the client devices 140A and 140B. The client devices 140A and 140B shown in FIG. 1 may be computing devices such as personal computers, laptops, mobile-computing devices, such as tablet computers or smartphones, wearable computing devices, and/or any other computing devices having computing and/or communications capabilities in accordance with the described embodiments. The client devices 140A and 140B each include a processing device in communication with a data storage device or memory and are able to execute instructions corresponding to system programs and application programs to perform various computing and/or communications operations. Exemplary system programs may include, without limitation, an operating system (e.g., iOS®, Android® OS, LINUX® OS, Firefox OS™, Windows®, OS X®, Binary Run-time Environment for Wireless (BREW) OS, JavaOS, a Wireless Application Protocol (WAP) OS, and others), device drivers, programming tools, utility programs, software libraries, (APIs), and so forth. As shown in FIG. 1, the client device 140A and 140B each execute software to provide an interface 142A and 142B, respectively. In some embodiments, the interfaces 142A and 142B may be provided in connection with a web-browsing program such as Internet Explorer®, Chrome®, etc. The client devices 140A and 140B may communicate with access management server 102, the administration system 130 and the distributed computing infrastructure 120 over the network 110.

In some embodiments, the client device 140A may be a client device used by administrative security personnel while the client device 140B is a client device used by a developer. The administrative security personnel and the developer may be required to log into or authenticate the client devices 140A and 140B to the access management server 102 to interact with the access management server 102 and the application 104 executing thereon. Exemplary interfaces that may be employed or provided by the access management server 102 in connection with the client devices 140A and 140B are described herein with respect to the exemplary interfaces in FIGS. 3-7.

In the illustrated embodiment of the access management system 100, the component systems such as the access management server 102, the administration system 130, and at least some of the hardware underlying the distributed computing infrastructure 120 may be provided by a server or cluster of servers. For example, the access management server 102 may be a computing device that comprises or implements one or more servers and/or software components that operate to perform various operations in accordance with the described embodiments. Exemplary servers may include, for example, stand-alone and enterprise-class servers operating a server operating system (OS) such as a MICROSOFT® OS, a UNIX® OS, a LINUX® OS, or another suitable server-based operating system. It should also be appreciated that the server 102 illustrated in FIG. 1 may be deployed in other ways and that the operations performed and/or the services provided by such server or servers may be combined or separated for a given implementation and may be performed by a greater number or fewer number of individual server devices.

Further, although the access management server 102 and the administration system 130 are depicted in FIG. 1 as being separate from the distributed computing infrastructure 120, some embodiments of the present disclosure may include the access management server 102 and/or the administration system 130 as being provided by one of the resources 122A-D of the distributed computing infrastructure 120. For example, in embodiments in which the distributed computing infrastructure 120 is AWS, the access management server 102 may be provided by an Amazon EC2 instance executing an application defining the services and functions of the access management server 102.

Figure 2:
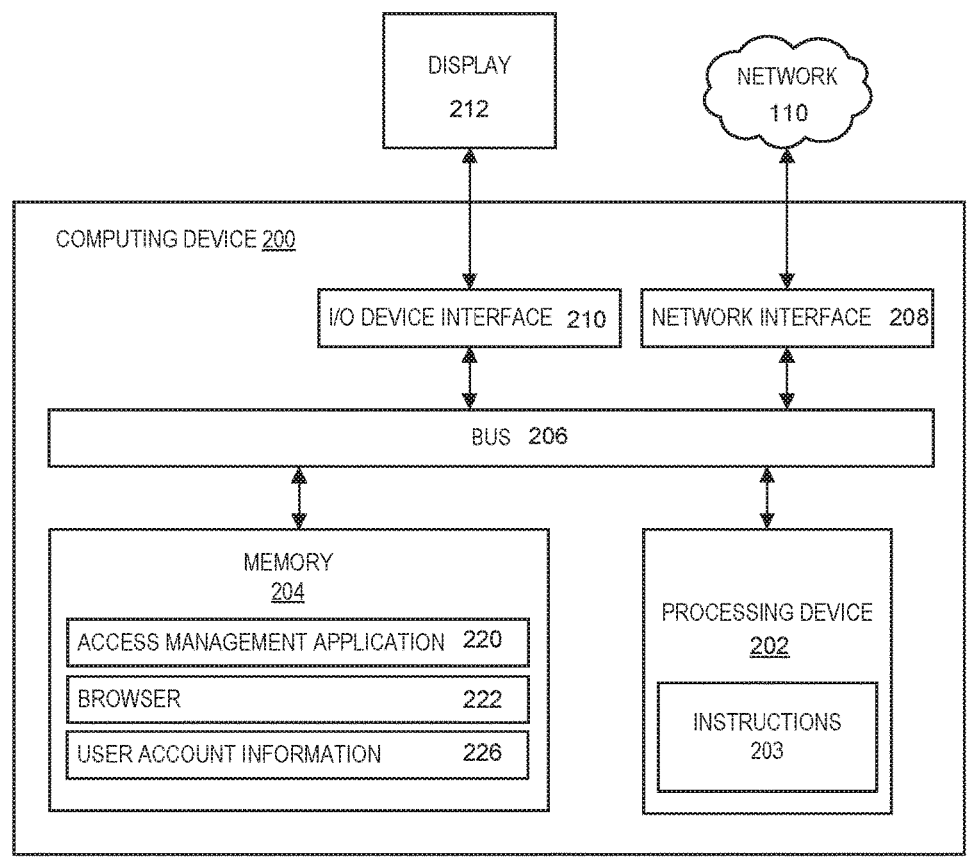
FIG. 2 is a block diagram of a computing device that may be employed as the access management server of FIG. 1, according to some aspects of the present disclosure.

Referring now to FIG. 2, shown therein is an exemplary embodiment of a computing device 200, embodiments of which may provide the access management server 102 of FIG. 1 as described herein or the client devices 140A and/or 140B. The computing device 200 includes a processing device 202, such as one or more processors or CPUs, in communication with a data storage device or memory 204 over a bus 206. The bus 206 further couples to a network interface device 208 and an I/O device interface 210. The network interface device 208 may be a network interface card or network interface controller (NIC) that permits the computing device 200 to communicate over the network 110 of FIG. 1. The I/O device interface 210 enables the computing device 200 to communicate information to be rendered to a display 212 to display information such as data and command options in one or more graphical user interfaces associated therewith. The I/O device interface 210 may further communicate with I/O devices such as infra-red or radio-frequency remote controls, keyboards, mice, touchscreens, etc. in some embodiments, the I/O device interface 210 may be an application programming interface (API) by which the other systems of FIG. 1 may communicate with the computing device 200.

The processing device 202 may execute software and/or other instructions 203 stored in the memory 204. The software and information stored in the memory 204 and the instructions 203 may be different depending on whether the computing device 200 is configured as the access management server 102, the administration system 130, one of the client devices 140A and 140B, or as a server underlying the distributed computing infrastructure 120. Additionally, the computing device 200 may be a virtual computing device in some embodiments, such as a configured resource instance in the distributed computing infrastructure 120.

The access management application 104 of FIG. 1 may be provided by executing instructions 203 on the processing device 202. As illustrated in FIG. 2, the memory 204 stores an access management application 220 and a browser 222. The access management application 220 may include a plurality of rules and/or algorithms that may be implemented as part of the access management application 220 to determine when access to a particular object should be revoked or removed from an access policy associated with a particular entity. For example, the access management application 220 may be configured to determine that a first application should no longer have access to a first API. In embodiments of the computing device 200 that may provide for the client device 140A or the client device 140B, the access management application 220 may be a client application configured to communicate with the access management server 102. Other embodiments of the computing device 200 that may provide for the client device 140A or 140B to include the browser 222 to communicate with the access management application 220 of an embodiment of the computing device 200 configured to provide the access management server 102.

The memory 204 may be a collection of memories of different types that are included in a housing of the client computing device or coupled to the computing device 200 and in communication therewith. For example, the memory 204 may include cache memory, RAM, ROM, a solid-state hard drive, a disk-based hard drive, and/or other types of non-transitory memory devices. The components depicted as stored on the memory 204 may be stored on and/or accessed from any combination of these different types of memories.

As illustrated in FIG. 2, the memory 204 includes a set of user account information 226, which may include information identifying entities having access permission, including an associated access policy, within the environment of the access management system 100. For example, the user account information 226 may include an account associated with a first application, an account associated with a developer or a developer team associated with the first application, an account associated with administrative security personnel. When the account included in the user account information 226 is associated with an application, the user account information 226 may include contact information for a developer or developer team that is associated with the application. In this way, when the access management server 102 transmits a communication associated with the application the communication may be directed to the developer or developer team.

Referring now to FIGS. 3, 4, 5, 6, and 7 shown therein are exemplary user interfaces that may be provided by the access management server 102 described herein in connection to FIGS. 1 and 2. The exemplary user interfaces may facilitate communication and interaction between users of the access management server 102, such as a developer or developer team and administrative security personnel of an organization, and the access management server 102 itself. The exemplary user interfaces may facilitate communication between the access management server 102 and the users thereof. For example, a user may log into the access management server 102 and be presented with one of the exemplary user interfaces to receive a notification or alert of a modification made to an access policy or a modification scheduled to be made to access policy. Additionally, the user interfaces may facilitate the handling of requests to grant access to one or more objects, such as APIs, requests to reinstate access to one or more objects, the access to which has been previously removed, and other requests. In some embodiments, the exemplary user interfaces may facilitate responses to such requests. For example, administrative security personnel may respond to requests for access to an API for an application by a developer of the application.

Figure 3:
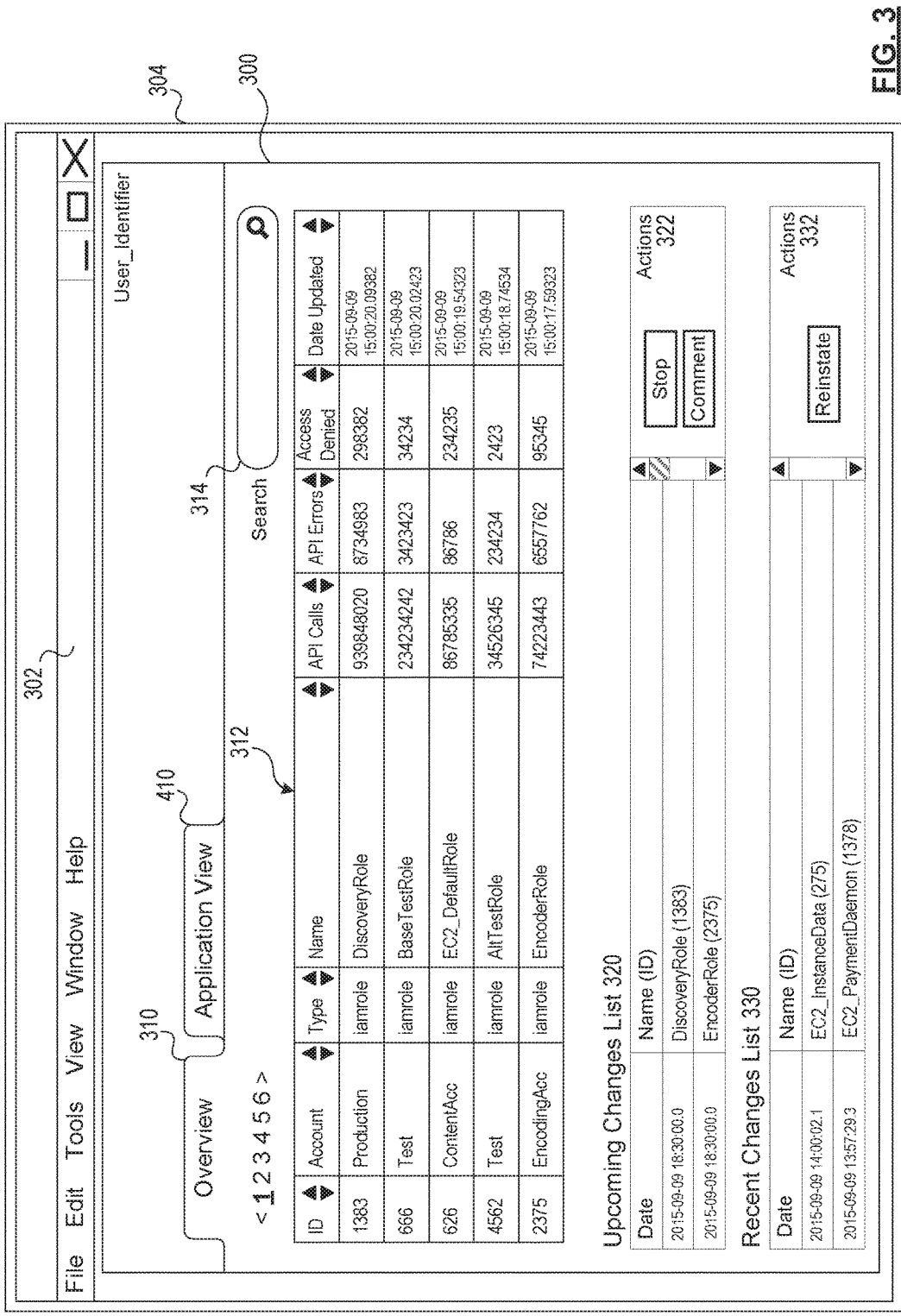
FIGS. 3, 4, 5, 6, and 7 are exemplary user interfaces that may be provided by the access management server of FIG. 1, according to some aspects of the present disclosure.

FIG. 3 illustrates an exemplary user interface 300 that may be presented to a developer after logging into the access management application 104 executing on the access management server 102. The exemplary user interface 300 may be displayed in a window 302 rendered to a display 304. The display 304 may be part of or coupled to the client device 140A to provide the user interface 300 as the interface 142A of FIG. 1. The exemplary user interface 300 may provide an overview tab 310 that includes a plurality of fields each providing an overview of a specific type of information to the user. The illustrated embodiment of the user interface 300 includes an overview table 312 that presents information to the user regarding one or more applications that are monitored by the access management server 102 to be presented to the user. The illustrated user interface 300 further includes an upcoming changes list 320 and a recent changes list 330.

The overview table 312 may include a row for each application being monitored by the access management server 102. As illustrated, the overview table 312 includes columns associated with an identifier of each application, an account in the distributed computing infrastructure 120 associated with the application, a type of application with respect to the distributed computing infrastructure 120, and a name of the application. The overview table 312 further includes counts of API calls, API errors, and access denied errors of each application. The overview table 312 further includes an indication of the date at which the information for each application was last updated. The overview table 312 may be sorted according to any of these columns. Additionally, a search field 314 may permit a user to search through the many applications listed in the overview table 312. In some embodiments, the user may be able to select an application in order to be presented with additional information specific to that application.

The upcoming changes list 320 may provide information to the user regarding scheduled modifications associated with a particular entity, such as the user or an application with which the user is associated. The upcoming changes list 320 may further indicate when each scheduled modification is scheduled to occur. By selecting on an application, a pop-up or other user interface element may provide information regarding the scheduled modification. The upcoming changes list 320 may present an action field 322 including a plurality of buttons or other user interfaces to permit the user to request that a scheduled modification be stopped or that permit the user to comment on a scheduled modification. A selection of the comment user interface element may cause the comment field to be presented to the user. The user may submit a comment in the comment field, which may then be relayed by the access management server 102 to administrative security personnel.

The recent changes list 330 may present information describing modifications recently enacted by the access management server 102. For example, when the access management server 102 removes access to an API by a first application, the first application may be identified along with the API and a date on which the modification occurred. The recent changes list 330 may include an action field 332 that includes a plurality of user interface elements whereby the user may request reinstatement of a removed access permission, such as reinstatement of access to the API.

Figure 4:
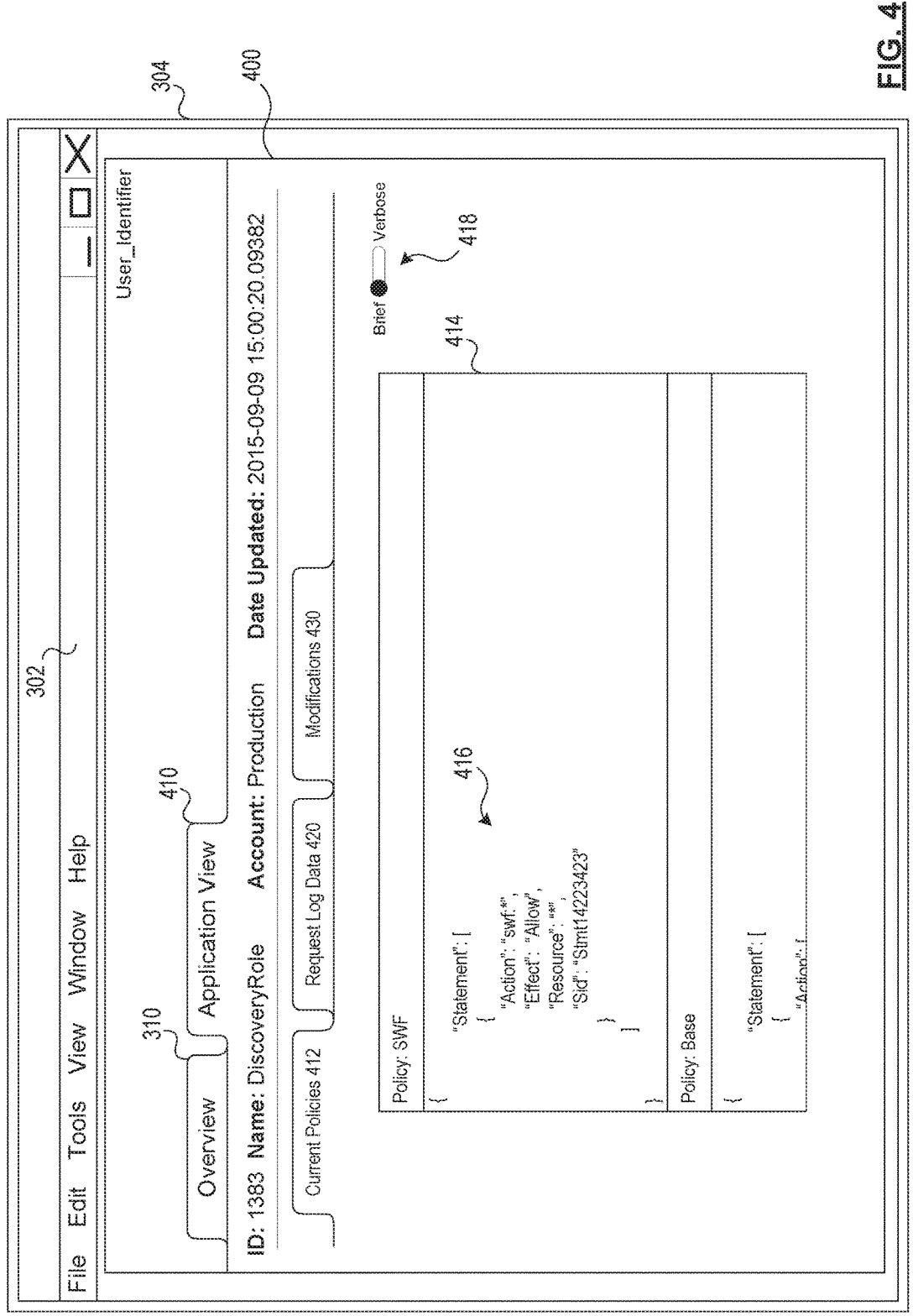

Referring now to FIG. 4, shown therein is a user interface 400 that is configured to provide information with respect to an application or a user. The user interface 400 may be used to view the current policies associated with the entity, view request log data associated with the entity, and request modifications to the policies associated with the entity for example. For example, the user interface 400 may be used by a user to request reinstatement of a previously removed access permission, or the user interface 400 may be used to request a new access permission.

As illustrated in FIG. 4, a current policies tab 412 is selected and includes a current policy field 414. The current policy field 414 includes a list of each of the policies associated with the application named "DiscoveryRole." The current policy field 414 includes a policy 416 that may be used to grant and/or deny permissions to the DiscoveryRole application or to multiple instances thereof. As illustrated in FIG. 4, the policy 414 is presented in the JSON format, an open standard format with human-readable text. The user interface 400 includes a details element 418. The details element 418 may be toggled between a "brief" mode and a "verbose" mode. The policy 416 includes a wildcard policy "swf.*" that represents or stands in for a plurality of policies that include an "swf." prefix. When the "brief" mode is selected, the wildcard policy may be presented to the user in the policy 416. When the "verbose" mode is selected by the details element 418, each policy associated with the "swf." prefix may be displayed in the policy 416.

Figure 5:
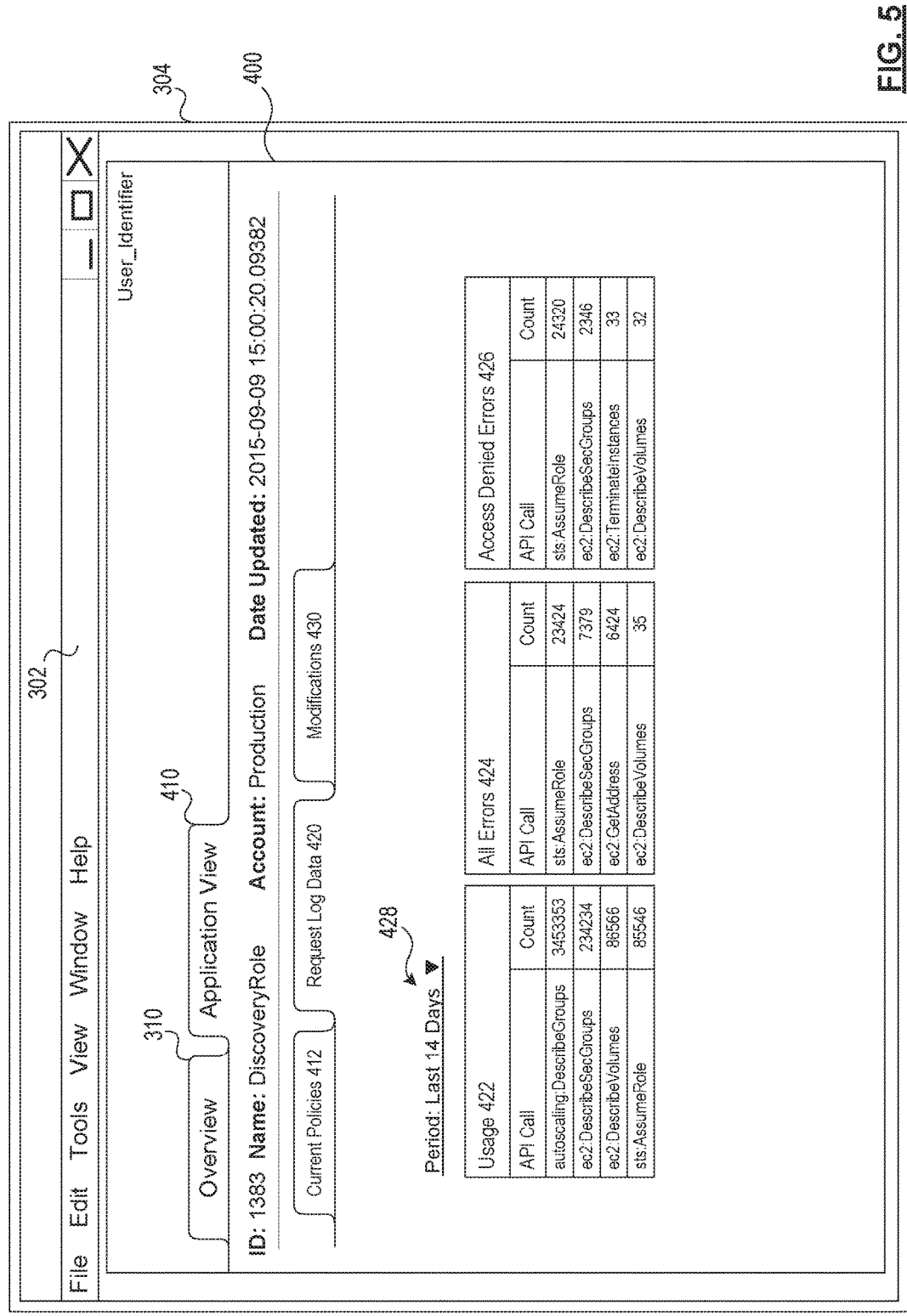

Referring now to FIG. 5, shown therein is the user interface 400 with the request log data tab 420 selected. With the request log data tab 420 selected, the user interface 400 presents information obtained from the request log 124 of the distributed computing infrastructure 120 by the monitoring service 128 of FIG. 1. The request log 124 includes information regarding access calls made by a user, application, or other entity. The request log 124 further includes a count of errors and a count of access denied errors. As illustrated in FIG. 5, the request log data 420 includes a usage table 422, all errors table 424, and an access denied errors table 426. The usage table 422 includes a listing of APIs called by the "DiscoveryRole" application and a count of each API call. The all errors table 424 includes a listing of API calls that resulted in errors and a count of those errors. The access denied errors table 426 includes a listing of API calls according to a count of access denied errors resulting from the API calls. As illustrated, the listings in the usage table 422, the all errors table 424, and the access denied errors table 426 are presented in order from highest count to lowest count. Each of these listings may be sorted according to another metric, such as alphabetically by API call. The user interface 400 of FIG. 5 further includes a period of observation selector 428. A user may interact with the period of observation selector 428 to select a period of observation, such as the last 15 minutes, the last day, or the last month. As illustrated, the user of the user interface 400 has selected a period of observation of 14 days.

Figure 6:
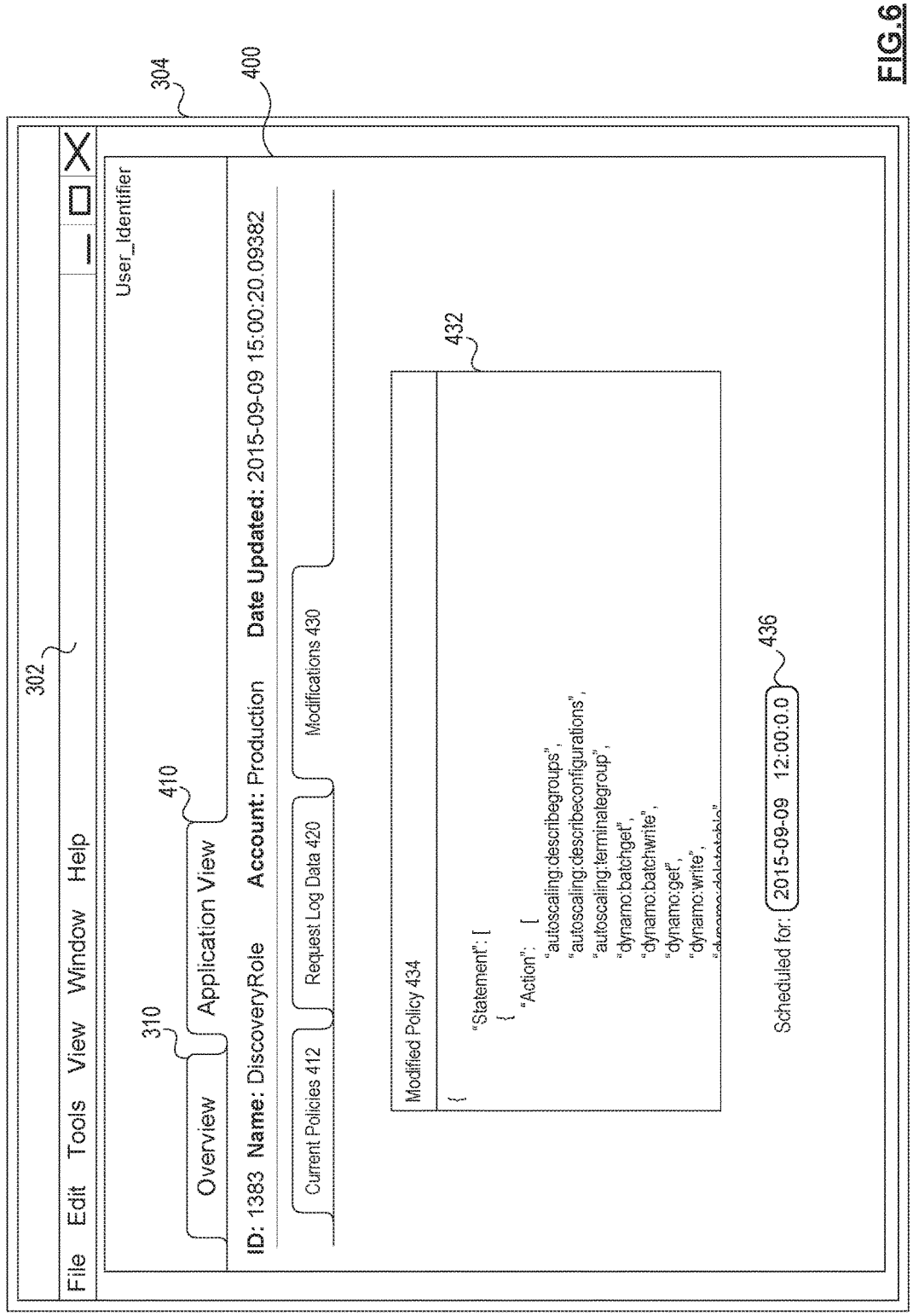

Referring now to FIG. 6, shown therein is the user interface 400 with the modifications tab 430 selected. When the modifications tab 430 is selected, a modified policy field 432 is presented in the user interface 400. The modified policy field 432 lists a modified policy 434 for the "DiscoveryRole" application. The modified policy 434 may include a subset of permissions as listed in the current policy field 414 of FIG. 4. For example, the access management server 102 may determine that permission to call a specific API is not warranted to the "DiscoveryRole" application based on information included in the request log 124 of FIG. 1. The access management server 102 may enact changes to the policy or policies associated with the "DiscoveryRole" application by editing a text file defining the policy. These changes may be part of a policy modification process. The access management server 102 may automatically schedule a time at which the modified policy will be implemented. This scheduled time is displayed in the scheduled time field 436. A user of the user interface 400 may interact with the scheduled time field 436 to alter the scheduled time. For example, the user may enter a different schedule time in the scheduled time field 436.

Figure 7:
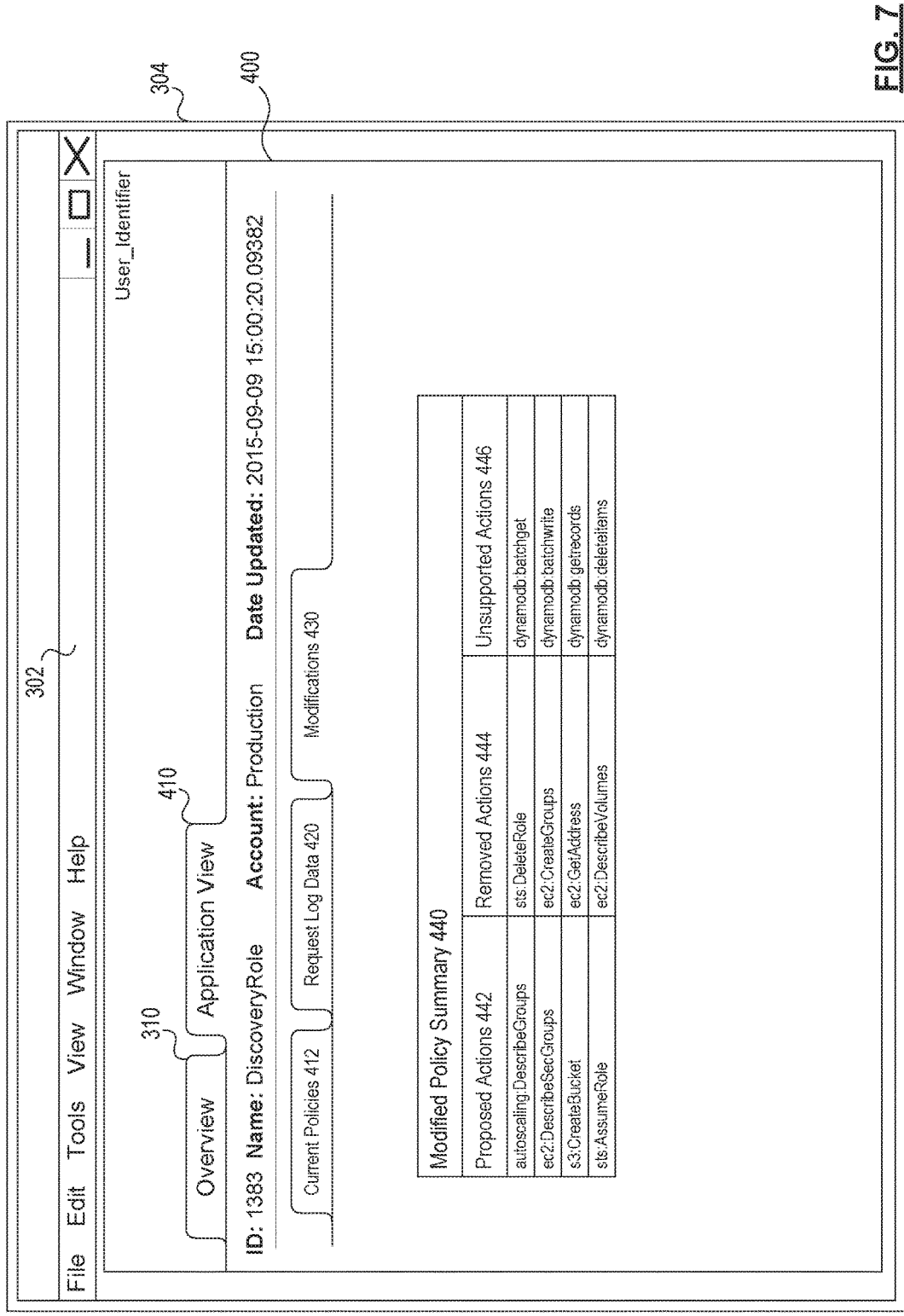

Referring now to FIG. 7, shown therein is the user interface 400, gain with the modifications tab 430 selected. The modifications tab 430 includes a modified policy summary 440. The modified policy summary 440 may be a table or collection of tables that summarize the modified access policy. As illustrated, the modified policy summary 440 includes a proposed actions list 442, a removed actions list 444, and an unsupported actions list 446. The proposed actions list 442 includes a listing of items to which the "DiscoveryRole" application is to have access after the modified access policy is implemented by the access management server 102 in the distributed computing infrastructure 120 of FIG. 1. The removed actions list 444 includes a listing of items (in the illustrated example, API calls) that are to be removed from the current policy or policies associated with the "DiscoveryRole" application. The unsupported actions list 446 includes a listing of API calls that are not monitored by the monitoring service 128 of FIG. 1. Access to such API calls may not be automatically modified by the access management server 102, and so may be provided in the user interface 400 to inform a user that these API calls may need to be monitored manually.

Figure 8:
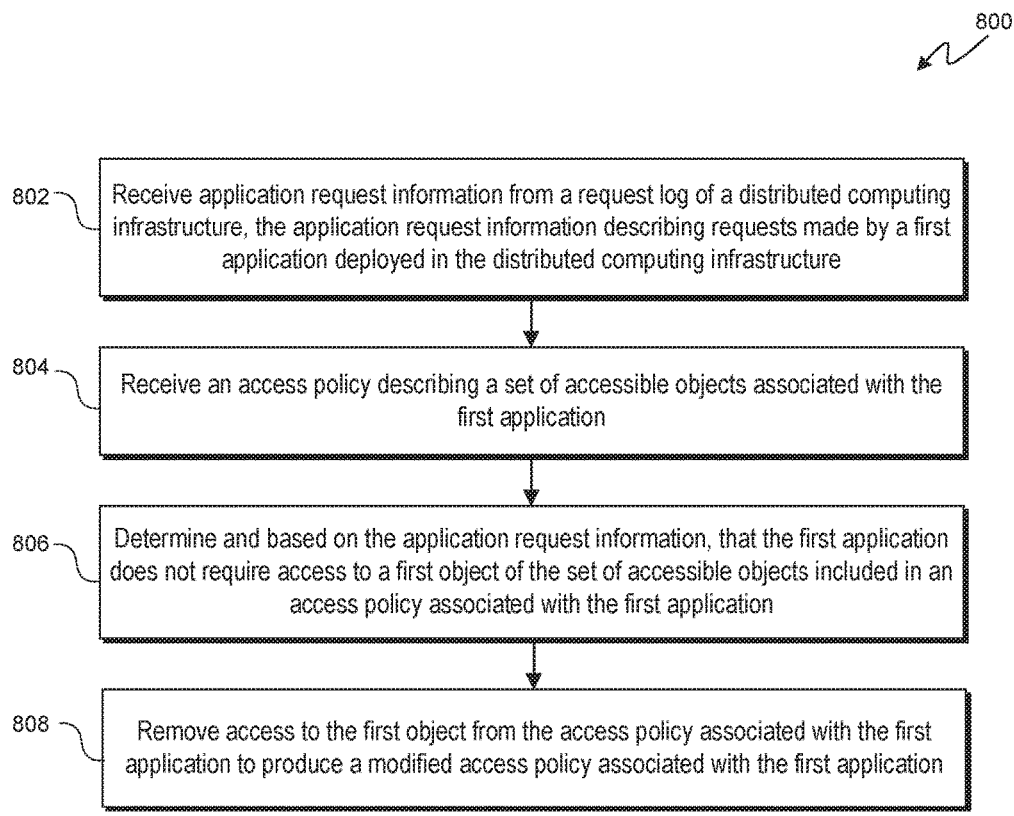
FIG. 8 is a flowchart illustrating a method of managing access permissions in a distributed computing environment, according to some aspects of the present disclosure.

Referring now to FIG. 8, shown therein is a flowchart of a method 800 for managing access permissions. As illustrated, method 800 includes several enumerated steps or operations. Embodiments of the method 800 may include additional steps or operations before, after, in between, or as part of the enumerated operations. Some embodiments of the present disclosure include instructions like the instructions 203 of FIG. 2 stored on a non-transitory computer-readable storage medium, like the memory 204 of FIG. 2. When executed, the instructions may cause a processing device, like the processing device 202 of computing device 200 to perform operations associated with embodiments of the method 800. Embodiments of the method 800 may be performed by execution of an application, such as the access management applications 104 and 220 of FIGS. 1 and 2, respectively.

Embodiments of the method 800 may begin at step 802 at which a processing device in communication with one or more storage devices receives application request information from a request log of a distributed computing infrastructure. The application request information describing requests made by a first application deployed in the distributed computing infrastructure. For example, the processing device of the access management server 102 may receive information from the request log 124 of the distributed computing infrastructure 120 is illustrated in FIG. 1. The request log 124 may be a searchable database of information regarding requests for access to an object, such as APIs associated with resources 122A, 122B, 122C, and/or 122D. The distributed computing infrastructure 120 may include a search engine operating on a search server, such as an Elasticsearch server, to facilitate access to information included in the request log 124. In some embodiments, the request log 124 may be provided by AWS CloudTrail and may include an identity of the user or application that called the API, the time of the API call, a source and dress of the API collar, a region of the distributed computing infrastructure 120 that is associated with the call, call parameters, and/or response elements returned by the distributed computing infrastructure 120.

At step 804, the processing device may receive an access policy describing a set of accessible objects associated with the first application. For example, the processing device of the access management server 102 may communicate with the security application 132 executing on the administration system 130 of FIG. 1. The security application 132 may communicate one or more of the access policies defined therein, such as the access policy 134A or access policy 134B. The access policy may define, in a variety of implementations, one or more objects that the first application is permitted access. For example, the access policy may define a set of APIs that are accessible to the first application, or which the first application may call within the distributed computing infrastructure 120. The access policy may define the set of APIs accessible to the first application by listing the APIs or by providing a level of access that corresponds to a predefined subset of APIs exposed by the distributed computing infrastructure 120 on the account within the distributed computing infrastructure 120 associated with the first application.

At step 806, the processing device, based on the application request information, may determine that that the first application does not require access to a first object of the set of accessible objects included in a particular access policy associated with the first application. For example, the processing device of the access management server 102 may determine that the first application does not require access to a first API included in a set of accessible APIs defined by an access policy associated with the first application. In some embodiments, determining that the first application "does not require access" to the first API may include determining that the first application has not used or called the first API more than a threshold number of times during a given period of observation. In other embodiments, determining that the first application does not require access to the first API may include determining that the first application is producing more than a threshold number of errors when calling first API in the distributed computing infrastructure 120. The threshold number of errors may be defined in terms of the type of error produced by the API calls. For example, when calls to the first API result in access denied errors, the threshold number of errors may be lower than when the first API calls result in different types of errors, for example errors resulting from improper parameters included in the API call.

At step 808, the processing device may remove access to the first object from the access policy associated with the first application to produce a modified access policy associated with the first application. This modified access policy may be stored in the administration system 130 in association with the security application 132. For example, the processing device of the access management server 102 may modify an access policy associated with a first application to remove an API from a set of APIs that were accessible to the first application according to the API from a list of APIs included in the access policy or by altering an access level indicated by the access policy.

Embodiments of the method 800 may further include operations, performed by the processing device, such as receiving a request from a user associated with the first application to reinstate access to the first object, or in some embodiments, the first API. The request may be received through a user interface such as the user interface 300 of FIG. 3, by which the user may select the first API from a listing of recent changes in the access policy associated with the first application. The user may select a button or other user interface element to cause the request to be sent from a client device associated with the user. Embodiments of the method 800 may further include determining that the request satisfies predetermined conditions for reinstatement of access to the first object and adding access to the first object in the modified access policy associated with the first application to produce a newly modified access policy associated with the first application. For example, the access management server 102 may receive the request initiated by the user via the user interface 300. The access management server 102 may check to see whether the request is received before predetermined time after removal of access to the first object, whether the removal of access to the first object or first API resulted from a lack of requests to access the first object during the period of observation, and/or whether the first object is not included on a list of secure objects. For example, the security application 132 may include a list of APIs that may require the intervention of administrative security personnel for reinstatement. When the requested API is on such a list of APIs, the access management server 102 may generate a communication and transmit that communication to administrative security personnel via a user interface, such as the user interface 700 of FIG. 7.

In some embodiments of the method 800, the processing device may monitor usage of a second object by the first application during the period of observation. For example, the access management server 102 may receive application request information from the request log 124 of the distributed computing infrastructure 120. Based on the usage or number of calls to a second API included in an access list of the first application, the processing device may determine that the usage of the second API the first application is less than a threshold usage value. The processing device of the access management server may schedule removal of access to the second API based on the usage thereof. Upon scheduling the removal of access to the second API, the access management server 102 may transmit a communication to a first user associated with the first application. For example, the access management server 102 may send an email, text message, or push notification, to a developer or developer team having responsibility for the first application. The communication transmitted by the access management server 102 may identify the first application, the second API, and the time at which removal of access to the second API is scheduled. The communication may be received by the user in the user interface 300 of FIG. 3.

Embodiments of the method 800 may further include operations of receiving a request from the first user to prevent the scheduled removal of access to the second object, determining that the request satisfies one or more conditions, and automatically preventing the scheduled removal of access to the second object by the first application. For example, via the user interface 300 of FIG. 3, the user may manipulate a user interface element such as the stop button to request that the scheduled removal of access to a second API be unscheduled or be stopped. For example, the second API may have been included in an earlier stage of development of the first application, wherein the earlier stage of development did not require access to the second API. When the first application enters or approaches a follow-on stage of development, the first application may need to call the second API to implement features to be deployed by the first application in this subsequent stage of development. Using the user interface 300 of FIG. 3 or another user interface provided by the access management server 102 in communication with a client device, a developer associated with the first application may be able to request that the scheduled removal not occur. Depending on the satisfaction of one or more conditions, such as the second API to which access is scheduled to be removed, the access management server 102 may automatically prevent the scheduled removal of access to the second API.

Figure 9:
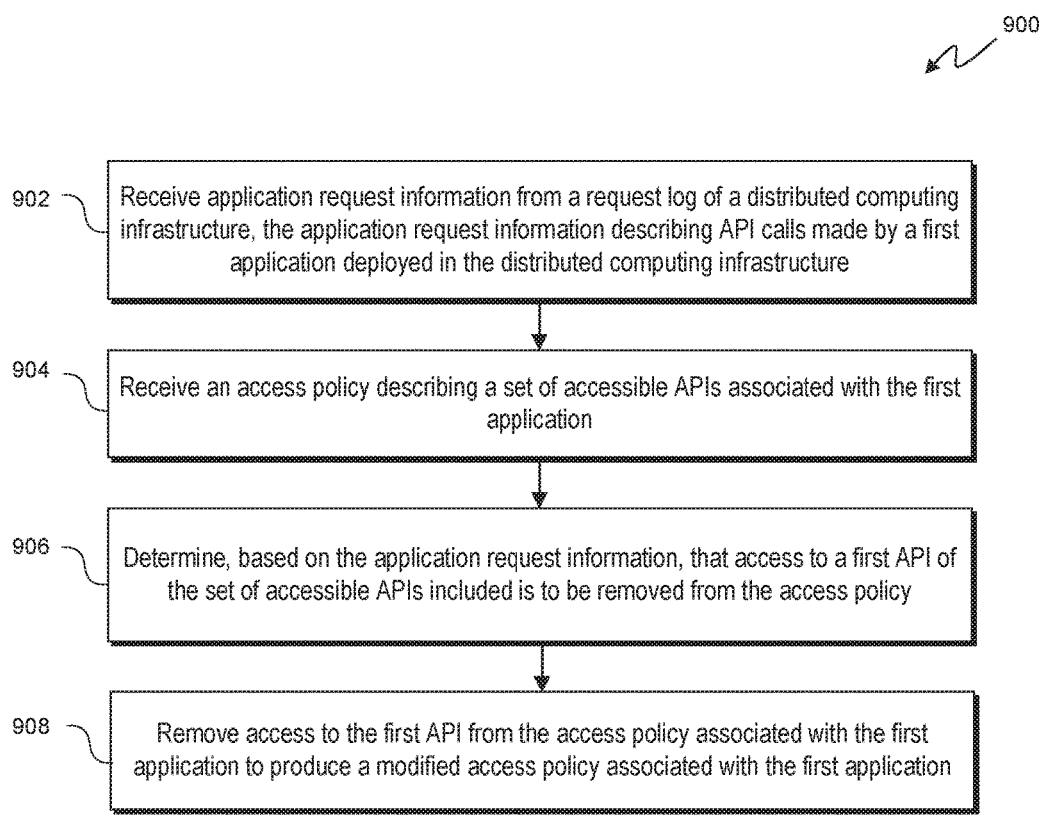
FIG. 9 is a flowchart illustrating a method of managing access permissions in a distributed computing environment, according to some aspects of the present disclosure.

Referring now to FIG. 9, illustrated therein is a flowchart of a method 900 of managing access permissions within a distributed computing infrastructure. The access permissions may be granted, revoked, reinstated as part of a management process. As illustrated, method 900 includes several enumerated steps or operations. Embodiments of the method 900 may include additional steps or operations before, after, in between, or as part of the enumerated operations. Some embodiments of the present disclosure include instructions like the instructions 203 of FIG. 2 stored on a non-transitory computer-readable storage medium, like the memory 204 of FIG. 2. When executed, the instructions may cause a processing device, like the processing device 202 of computing device 200 to perform operations associated with embodiments of the method 900. Embodiments of the method 900 may be performed by execution of an application, such as the access management applications 104 and 220 of FIGS. 1 and 2, respectively.

Embodiments of the method 900 may begin at step 902 at which a processing device receives application request information from a request log of a distributed computing infrastructure. The application request information may describe API calls made by a first application deployed in the distributed computing infrastructure. For example, the access management server 102 may include a processing device configured to receive application request information from a request log of the distributed computing infrastructure 120, as described herein.

At step 904, the processing device may receive an access policy describing a set of accessible APIs associated with the first application. For example, the access management server 102 may receive an access policy 134A, associated with the first application, from a security application 132 running on the administration system 130 of FIG. 1. At 906, based on the application request information and the access policy, the processing device may determine that access to a first API of the set of accessible APIs is to be removed from the access policy. For example, the access management server 102 may determine that an insufficient number of calls to the first API have been made during an observation period. As another example, the access management server 102 may determine that an excessive number of errors have resulted from calls and to the first API made during an observation or at a rate that is higher than a permitted rate.

At step 908, the processing device may remove access to the first API from the access policy associated with the first application to produce a modified access policy associated with the first application. Accordingly, the modified access policy associated with the first application may have more limited access to a set of APIs as compared to the access policy prior to modification by the access management server 102.

In some embodiments of the method 900, the processing device may receive a request to reinstate access to the first API in the access policy associated with the first application. For example, the access management server 102 may receive a request to reinstate the first API from a client device associated with a first user, such as one of the client devices 140A and 140B. Thereafter, the processing device may reinstate access to the first API in the access policy associated with the first application based on the received request.

Embodiments of the presently disclosed systems, servers, devices, and methods may provide for management of access permissions, including access permissions to APIs exposed in a distributed computing infrastructure 120. Some embodiments of the present disclosure may permit an entity such as an application to begin with a first level of access that is curtailed or limited over time based on the usage of objects accessible at the first level of access. For example, a set of accessible APIs may be curtailed depending on the usage of the APIs during a period of observation. Some embodiments of the present disclosure may permit the curtailment of access when a rate of errors or count of errors associated with the access exceeds a defined threshold rate or count. This may prevent throttling of associated applications in an account on the distributed computing infrastructure 120, thereby improving performance of the associated applications.

As noted herein, an entity requesting access to object may be a human user having a user account and/or login credentials to access objects, such as applications, made available through a networked environment such as a corporate VPN. In practical applications, embodiments of the present disclosure may provide a layer of protection to prevent unauthorized access to protected applications in the event that a bad actor gains access to a primary user device, like a laptop. In some instances, the bad actor may be able to gain access to the device after the authorized user of that device has already logged into the device. For example, the user may step away from the device, left on a table in a coffee shop, to pick up an order of coffee. Because walking over to pick up an order of coffee may take so little time, the user may opt to leave the device unlocked and logged-in. A bad actor may act quickly to take the user's unattended laptop while in its unlocked, logged-in state.

Embodiments of the present disclosure limit exposure to certain information by limiting access to one or more web-based applications even when the user has been properly logged into a distributed computing environment, such as logged into a corporate virtual private network (VPN). The system may determine whether a particular application is one that the authorized user has accessed within a predetermined time period. If the last access was outside the time period, the system may prevent access unless a secondary device, like a smartphone that belongs to the user, is used to send a response to a push notification that confirms the user's initial request. Upon receipt of the response from the smartphone, the system may then grant access, permitting the user's laptop to connect to the protected application. This protection occurs in real-time, i.e. when access to an application is requested, rather than at the time the user first logs into the VPN that provides access to the application. Additionally, the delay experienced by the user because of the protection may be less than a few seconds. In this way, the cost of the protection imposed on the user may be small compared to the benefit of protecting sensitive application data from theft by a bad actor.

As a non-limiting example, a user may attempt to access a protected application that requires authorization to permit access. The computing environment may include many such protected applications, which may provide access to existing confidential information or to enter or edit new confidential information, such as billing information for a streaming media service or contact information from media item providers, such as television and movie studios. Although such confidential information may be encrypted, access to such information should be limited. In order to simplify the process of gaining access to various resources or applications, a user request to access a particular protected application may be directed to an authorization control system. If the user does not have an active session or authenticated cookies in a browser, the authorization control system may redirect the user to an authentication system or service. The user may then provide credentials to the authentication system, such as a username and password. Additionally, the authentication system may require another factor in addition to the username and password combination. Accordingly, the authentication system may require multifactor authentication. For example after receipt of the users username and password, the authentication system may cause a push notification more than notification to be sent to the user with a code for the user to enter, such as a temporary alphanumeric code that is valid for a short period of time, such as minute. If required, the user may then provide the alphanumeric code to the authentication system. Upon receipt of valid credentials, the authentication system may redirect the browser back to the authorization control system, which in turn may direct the browser to the particular protected application the user requested to access. Where the authentication system provides for single sign-on authentication, the user may additionally be granted access to other protected applications in the event that the user requests to access those other protected applications.

In order to prevent loss of data, the authorization control system may also check a list of previous logins associated with the user. The list of previous logins may be present in a database may include a listing of applications that the user has accessed within a specified period of time and may include a last access date, indicating for each application the last time when the user accessed the application. Any large organization, many users are theoretically able to access many resources and applications in addition to those absolutely necessary for each user's ordinary work roles. For example, a software developer and the organization may have access to a customer service application but may not have a need to access that application as part of the developer's ordinary work. Similarly, an employee in the human resources department may utilize the same authentication system to access a human resources application that the developer uses to access a development application. Accordingly, while the single sign-on authentication system may allow users of an organization to avoid having to authenticate to many different applications during the course of the day, this approach may provide more access than is desirable.

According to the present disclosure, such problems may be mitigated by checking a list of applications accessed by a user within a specified period of time to determine how recently a user has accessed an application the user now seeks to access. For example, the authorization control system may communicate within access determination system having access feed information that lists the last time at which the user accessed a plurality of applications, including the application for which access is now sought. If the user has access the application in the recent past or the application is white listed, the access determination system may provide an access response to the authorization control system to allow access to the application. If the user has not access the application within the period of time, the access determination system may provide a conditional access response to the authorization control system. This access response or instructions to respond may direct the authorization control system to issue a communication to the user via another user device. For example, if the user is seeking to access the application on a primary device, such as a laptop or a desktop computing device, the access response may direct the authorization control system to issue a communication or directed a communication be issued to the user via a secondary device, such as a smart phone or a tablet computing device. This may be done by requesting that a push notification service send a push notification to the user's secondary device.

The push notification service may operate in connection with an application or service running on the user's secondary device to request confirmation from the user that the user has requested access to the application via the user's primary device. The push notification may provide the user with an option to confirm that the user requested access to the application or to deny that the user requested such access. If the user confirms the user's previous request, the response is sent through the push notification service back to the authorization control system, which response by granting the user access to the protected service. If the user denies that the user requested access, the authorization control system denies access to the primary device. This primary device may be in the possession of an unauthorized user who should not be able to access protected applications. The actions taken by the authorization control system may be communicated to the access determination system and the users access to the application may be recorded in a set of access feed information, which may be stored locally and/or remotely relative to the access determination system and used in subsequent access determinations.

In this way, embodiments of the present disclosure may provide for a desired level of access to protect applications for users and include an additional security measure at the time that infrequently used applications are being accessed.

The process of receiving a request from a primary device to access a protected application, determining that a notification should be sent, sending the notification to a secondary device, receiving a confirming response or an affirming response to the notification, and granting access to the primary device may be brief. For example, the process may take less than 30 seconds, less than 10 seconds, or less than five seconds. Because the added measures are taken with respect to applications that are infrequently accessed, the inconvenience to the user may be minimal, while the added security may be advantageous to the organization.

Other examples describing the components and the operations of authorization control system and the access determination system are provided herein. Combinations of these components and operations are within the scope of the present disclosure, including combinations specifically described and combinations that would be apparent to one of ordinary skill in the art based upon a careful reading of the present disclosure. Embodiments of the present disclosure may permit for a user using a first user device to be denied access in the absence of a confirming response to a notification from the user's second user device. Upon receipt of such a confirming response, the user's first user device may quickly be granted access to the desired resource.

Figure 10:
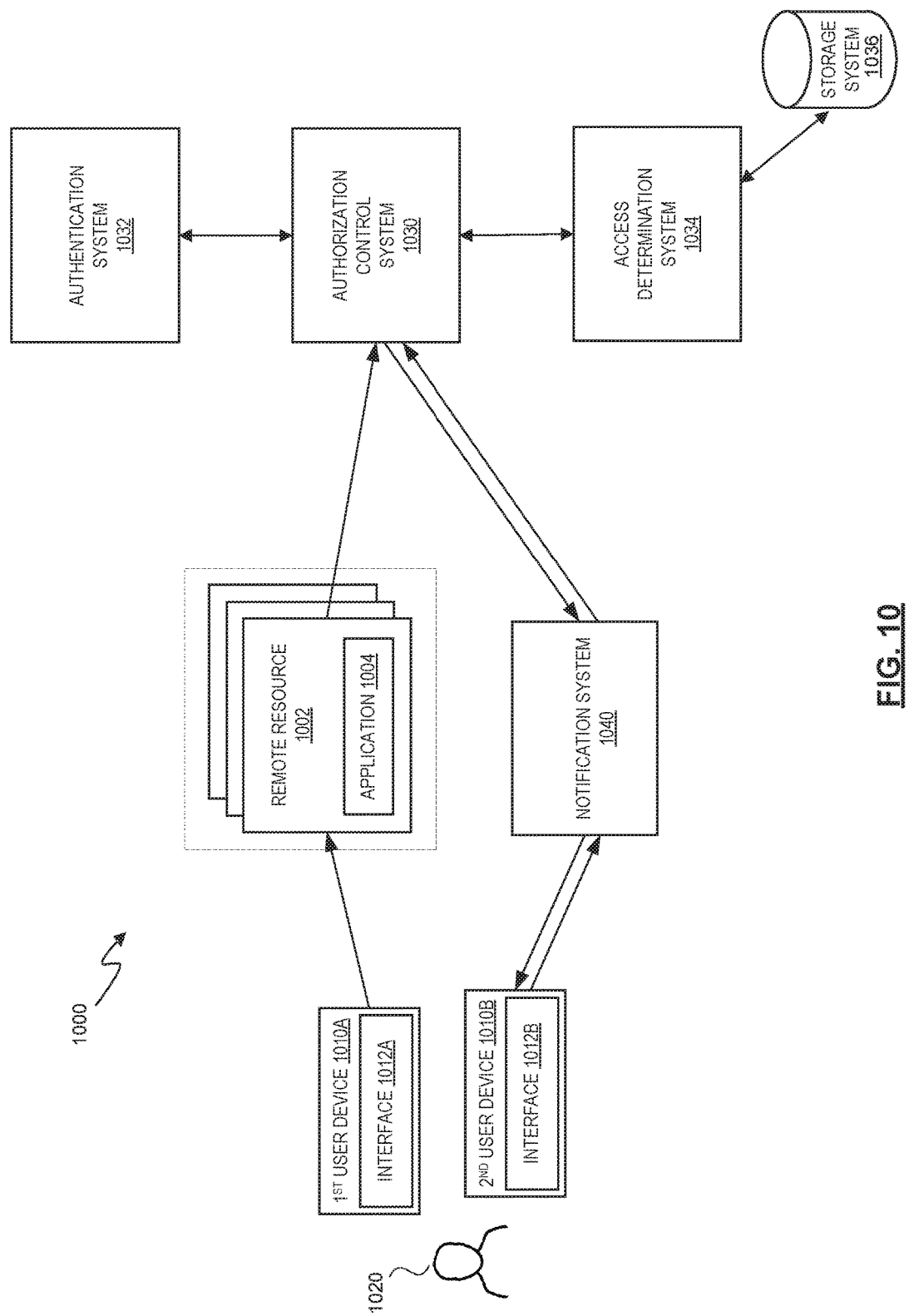
FIG. 10 is a block diagram of distributed computing environment including an authorization control system to oversee user access to a plurality of remote resources, according to some aspects of the present disclosure.

Referring now to FIG. 10, shown therein is a block diagram of a distributed computing environment 1000, according to some aspects of the present disclosure. The distributed computing environment 1000 includes a plurality of remote resources, like the exemplary remote resource 1002. The exemplary remote resource 1002 may be a server or a virtual machine executing on a server that provides a network-based application 1004. In some instances, the application 1004 may be referred to as a remote resource. The application 1004, like other applications included in the distributed computing environment 1000 may provide information and capabilities to one or more client computing systems. FIG. 10 shows two client computing systems: a first user device 1010A and a second user device 1010B, which are collectively referred to as user devices 1010. Reference is made to a single user device 110, may apply to either or both of the user devices 1010A and 1010B. These are devices 1010 may be any type of client computing system, such as a desktop computer, a laptop computer, tablet computer, a smart phone, etc. The devices 1010 may include one or more processors or processing devices, and one or more memories having executable instructions thereon, such as applications. As illustrated, the devices 1010A and 1010B each include an interface 1012A and 1012B, respectively. The interfaces 1012A and 1012B may be referred to collectively as interfaces 1012 or as a single interface 1012, when features common to both the interfaces 1012A and 1012B are described. In some embodiments, the interfaces 1012 may be web browsers, such as Internet Explorer®, Chrome®, etc. the interfaces 1012 may permit the user devices 1010 to communicate with the depicted plurality of remote resources, including the exemplary remote resource 1002 and/or an application 1004 executing thereon.

Both of the user devices 1010 may belong to and be used by a single user 1020. In order for the user 1020 to access either of the devices 1010, the user 1020 may be required to provide one or more credentials. For example to log into the user device 1010A, the user 1020 may be required to enter a username and password. Continuing with this example, the user 1020 may be required to enter a passcode or supply a biometric authentication credential, such as a fingerprint or an image of the face of the user 1020.

When the user 1020 causes the first user device 1010A to request access to the application 1004, the request may be passed on to or redirected to an authorization control system 1030. As described herein, the authorization control system 1030 may receive a request to access the application 1004, which is a protected resource. The authorization control system 1030 may determine whether the user device 1010A and/or the interface 1012A has an active and authenticated session. In some embodiments, this may be determined by checking for a valid authentication cookie. However, other techniques for determining whether the user device 1010A is in an authenticated session may be utilized in other embodiments. In some embodiments, the authorization control system 1030 may communicate with an authentication system 1032 to determine whether the first user device 1010A has a valid authorized session. The authorization control system 1030 may communicate with the authentication system 1032 by making calls to an application programming interface (API), such as a RESTful API. In other embodiments, the authorization control system 1030 in the authentication system 1032 may be integrated into a single service or system. In some embodiments, the authentication system 1032 may be third party authentication system, such as Google Authenticator provided by Google, Inc. of Mountain View, Calif., or PingID™ MFA provided by Ping Identity Corporation of Denver, Colo. The authentication system 1032 may provide for multifactor authentication. For example, if the authorization control system 1030 determines that the user device 1010A does not have a valid, authenticated session, the authorization control system 1030 may redirect the user device 1010A to the authentication system 1032 to establish such a session. The authentication system 1032 may request authentication credentials such as a username and password and may require an additional credential such as an alphanumeric code or numeric code sent to a device of the user 1020, such as the second user device 1010B. After the user 1020 provides sufficient authentication credentials, the authentication system 1032 may communicate with the authorization control system 1030 to establish a valid and active session for the user device 1010A.

When the authorization control system 1030 determines that there is a valid session, the authorization control system 1030 communicates with an access determination system 1034 to determine whether access should be granted to the application 1004. The authorization control system 1030 may call an API exposed by the access determination system 1034. The call may include resource or application request information that identifies the user 1020, by credentials provided via the first user device 1010A, and an identifier of the application 1004. Using the provided application request information, the access determination system 1034 queries an access information feed system, which may include an access feed storage system 1036. As described herein, the storage system 1036 may include local and remote storage devices that include a list of users of the environment 1000. The list may be searched based on an identifier of the user, such as a username, and/or the identifier of the application to which access is sought.

The access determination system 1034 may determine an appropriate access response based on information contained in the storage system 1036. Some embodiments of the access determination system 1034 may provide for three kinds of access responses. First, when the access determination system 1034 determines that the user 1020 has accessed the application 1004 within a predetermined time period or the application 1004 is a white listed application, the access response instructs the authorization control system 1030 to redirect the interface 1012A of the first user device 1010A to the application 1004, providing access to the application 1004. Second, when the access determination system 1034 receives application requests information that omits one or more critical items, the access response is to deny access to the application 1004 by the first user device 1010A. These critical items may include one or more of a user identifier, an application identifier, and an Internet protocol (IP) address of the first user device 1010A. Third, when the access determination system 1034 determines that the user 1020 of the first user device 1010A has not accessed the application 1004 within the predetermined time period, the access determination system 1034 issues on access response to the authorization control system 1030 to request additional information from the user 1020.

In some embodiments, the authorization control system 1030 and the access determination system 1034 may be collectively referred to as a resource or application access system. While depicted as separate components in FIG. 10, the authorization control system 1030 and the access determination system 1034 may be provided by an integrated service operating on a single server or a cluster of servers.

In order to gain additional information from the user 1020, the authorization control system 1030 may communicate with a notification system 1040. The notification system 1040 may act as an intermediary between the authorization control system 1030 and the second user device 1010B. For example, the notification system 1040 may be a push notification system such as a push notification system provided by Duo Security, Inc. of Ann Arbor, Mich. The authorization control system 1030 requests that the notification system 1040 issue a notification to the user 1020. The notification system 1040 transmits a notification to the user device 1010B. In some embodiments, the request from the authorization control system 1030 may identify whether the user 1020 is using the user device 1010A or the user device 1010B to request access to the application 1004. The notification system 1040 may determine which of the user devices 1010 should receive the notification, by sending the notification to whichever device is not being used to make the request. In other embodiments, the authorization control system 1030 may provide an indication of which device 1010 of the user 1020 should receive the notification.

The notification may be rendered in the second user device 1010B to present the user 1020 with one or more user interface elements. For example, the user 1020 may be presented with a message such as, "Did you request access to [Application Identifier]?," in which the message includes an identifier of the application 1004. In some embodiments, the message may further include an identifier of the first user device 1010A, such as a device type and/or IP address, and a time of the request for access. The notification may include one or more buttons, such as a "yes" button and a "no" button, the selection of which is communicated from the user device 1010B back to the notification system 1040. When the response from the user to the notification is an affirming or confirming response (i.e., a response that affirms or confirms the user has requested access to the application 1004), the authorization control system 1030 redirects the user device 1010A to the application 1004. When the response from the user 1020 to the notification indicates that the user 1020 did not make the request to access application 1004, the authorization control system 1030 may direct the user device 1010A elsewhere. For example, the authorization control system 1030 may direct the user device 1010A to an error page. In some instances, the notification system 1040 may start a timer when the notification is communicated to the second user device 1010B. When the time on the timer has elapsed without a response from the second user device 1010B, the notification system 1040 may provide an indication to the authorization control system 1030 that the notification has timed out. In such circumstances, the authorization control system 1030 may register the response from the notification system 1040 as a denial that the user 1020 requested access to the application 1004, and redirect the user device 1010A to an error page.

The authorization control system 1030 may provide an access result to the access determination system 1034. The access result includes information identifying the corresponding access request issued earlier by the access determination system 1034 to the authorization control system 1030 or may include information sufficient to identify the user 1020 and the application 1004. When the access result is to grant access by the user device 1010A to the application 1004, this result may be stored in the access feed storage system 1036 to include an entry indicative of the last time that the user 1020 and/or the user device 1010A accessed the application 1004. Similarly, the access determination system 1034 may produce a record that the user 1020 and/or the user device 1010A were denied access to the application 1004. This information may be used by the access determination system 1034 to identify potential anomalies that may indicate a security threat associated with the user 1020 and/or the user device 1010A.

In some embodiments, the authorization control system 1030 may deny access to the application 1004 even after receipt of a confirming response from the second user device 1010B. For example, when the IP address associated with the first user device 1010A indicates that the device 1010A is in an area, such as a region or country, to which access is to be denied, the authorization control system 1030 may redirect the first user device 1010A to an error page. The error page may include contact information or other mechanisms whereby the user 1020 may request assistance in obtaining access to the application 1004. For example, the error page may include a phone number to an automatic or manual phone system that enables the user 1020 to receive assistance.

Additionally, some embodiments of the access determination system 1034 may include a predetermined time period for the application 1004 that is different than a predetermined time period for another application. For example, the predetermined time period associated with the application 1004 may be 90 days, while the predetermined time period associated with another, more sensitive application may be 30 days. The predetermined time period associated with each application may be based on a rank of the importance of the particular application. The importance of the application may be determined by the type of information that may be read or written via the application, so that application providing access to more sensitive information may require more frequent access in order to avoid the requirement of additional factors to obtain access.

Figure 11:
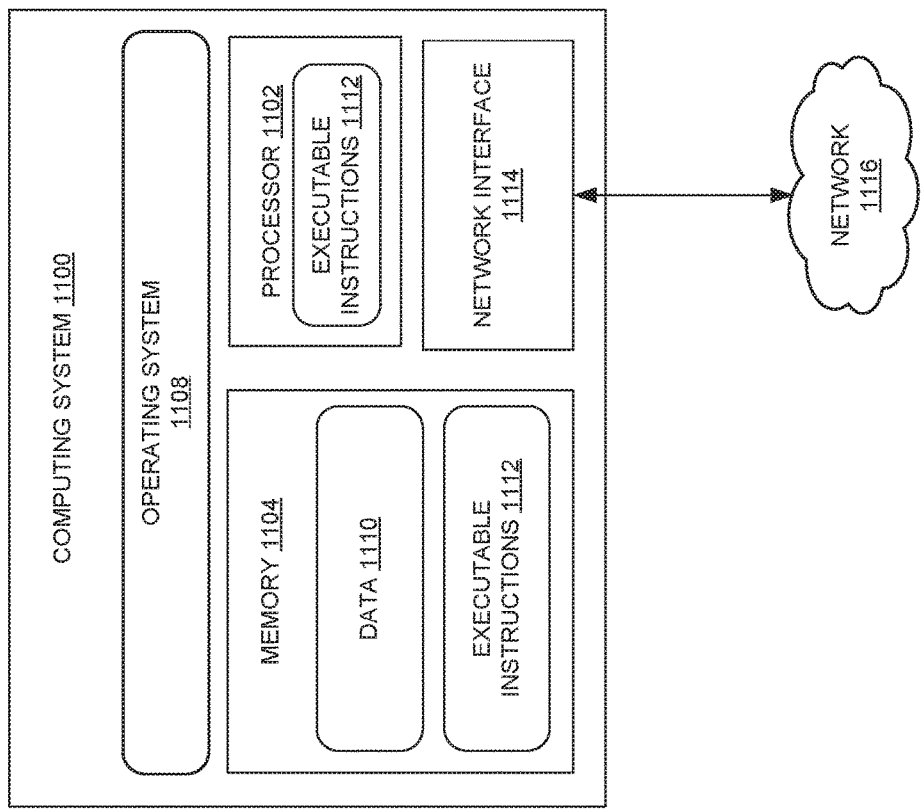
FIG. 11 is a block diagram of a computing device that may be employed in a variety of capacities in the computing environment of FIG. 10, according to some aspects of the present disclosure.

Referring now to FIG. 11, shown therein is an exemplary computing system 1100. Embodiments of the computing system 1100 may provide the user devices 1010, one of the remote resources 1002, the authorization control system 1030, the authentication system 1032, the access determination system 1034. Embodiments of the computing system 1100 may include additional features or omit depicted features to appropriately suit the computing system 1100 for its use. In general, the computing system 1100 includes a processor 1102 and a memory 1104. The processor 1102 may include a plurality of individual processors or processing cores. Similarly, the memory 1104 may include multiple memory components, such as a disk-based and/or a solid-state hard drive, RAM memory, cache memory, etc. an operating system 1106 may be executed on the processor 1102 to provide frameworks to execute individual applications and interface with in between various hardware components of the computing system 1100. The memory 1104 may include data 1110 and executable instructions 1112. The data 1110 may include information such as listings of users and records of the users last time of accessing various programs. The executable instructions may include instructions for many different computer programs. Exemplary system programs may include, without limitation, an operating system (e.g., iOS®, Android® OS, LINUX® OS, Firefox OS™, Windows®, OS X®, Binary Run-time Environment for Wireless (BREW) OS, JavaOS, a Wireless Application Protocol (WAP) OS, and others), device drivers, programming tools, utility programs, software libraries, (APIs), and so forth. The executable instructions 1112 may include instructions that are being executed by the processor 1102 to provide services and functionalities to users of the computing system 1100, which may be other computing systems in some embodiments.

The computing system 1100 may further include a network interface 1114, such as a network interface controller (NIC) or a collection of network interface hardware to enable the computing system 1100 to communicate with other systems via wired and/or wireless networks, represented by the network 1116. In some embodiments, the network 1116 may include multiple networks, such as a cellular network and the Internet. The networks that make up the network 1116 may be configured to communicate with each other through gateways or other devices and systems.

Figure 12:
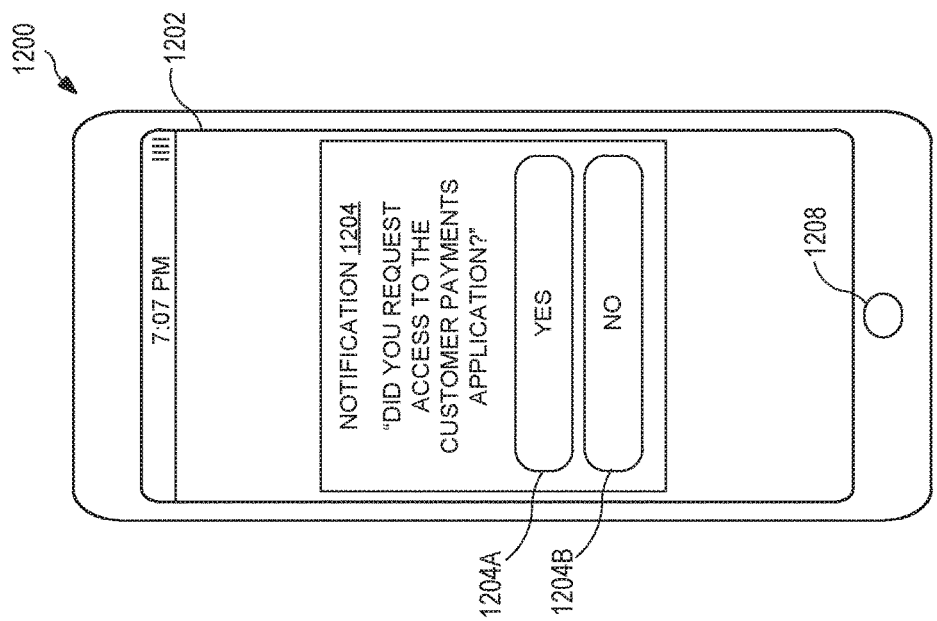
FIG. 12 is an exemplary user device having an interface, according to some aspects of the present disclosure.

Referring to FIG. 12, shown therein is an exemplary embodiment of the computing system 1100, configured as a smart phone 1200. As shown in FIG. 12, the smart phone 1200 includes a display 1202, which may be a touchscreen display configured to act as an input device in addition to displaying information to a user. The display 1202 includes a notification 1204, which may be presented to a user of the smart phone 1200 by the authorization control system 1030 to verify that the user has requested access to an application via another user device, such as a laptop computer. When the user, such as the user 1020 of FIG. 10, is presented with the notification 1204, the user may select from among interface elements to respond to a prompt or message included in the notification 1204. The depicted embodiment of the notification 1204 includes the message: "Did you request access to the customer payments application?" The user of the smart phone 1200 may select the user interface element 1206A or the user interface element 1206B, to indicate in an affirmative response or a negative response, respectively. As described herein, after selecting the user interface element 1206A, a primary device of the user may be connected to the desired application. Additionally, the smart phone 1200 may include other interface elements, such as the hardware-based interface element 1208. In some implementations, the interface element 1208 may be pushed or selected by the user to ignore the notification 1204 and to resume use of other applications on the smart phone 1200.

Figure 13:
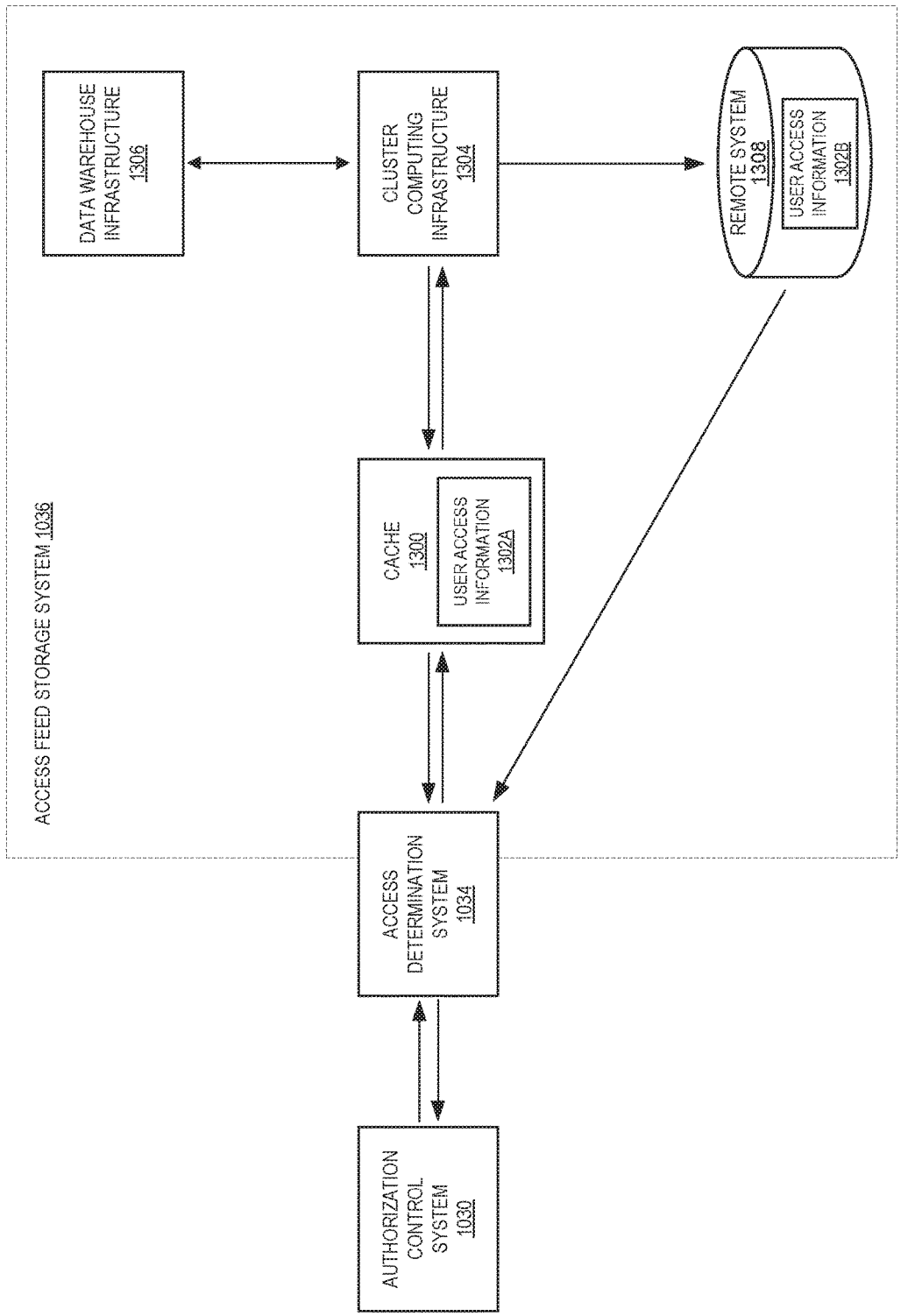
FIG. 13 is another block diagram showing aspects of the distributed computing environment of FIG. 10, according to some aspects of the present disclosure.

Referring now to FIG. 13, shown therein are some of the components of the environment 1000 as depicted in FIG. 10. For example, FIG. 13 includes the authorization control system 1030 and the access determination system 1034. FIG. 13 differs from FIG. 10 in depicting the access feed storage system 1036 an additional detail. The depicted embodiment of the access feed storage system 1036 includes a cache 1300, which stores a database or table of user access information 1302A. The cache 1300 may be memory local to or contained within the access determination system 1034. In some implementations, the cache 1300 is or includes a distributed off box cache in addition to a fallback local cache. The access feed storage system 1036 may include a table that includes entries associated with many different users and the last time each of those users accessed a variety of applications or other protected resources. For instance, an entry in the user access information 1302 a may include: an identifier of a user, and application to which the user requested access, an indication of whether the request was granted or denied, and the time of the granted access or denial. Accordingly, for any given user the user access information 1302A may include tens, hundreds, or thousands of entries, which may be listed based on a query of the cache 1300. The access determination system 1034 may provide the information for the table of user access information 1302A to the cache 1300. This information may also be provided to the cluster computing infrastructure 1304. For example, the cluster computing infrastructure 1304 may include one or more servers configured to operate as a cluster. The cluster computing infrastructure 1304 may run a cluster computing framework, such as Apache Spark or Apache Hadoop.

The authorization control system 1030 in the access determination system 1034 may obtain information associated with all successful logins to the protected remote resources 1002. Some embodiments may include information associated with unsuccessful logins in addition to successful logins. This information may be stored by the access determination system 1034 in a large-scale data warehouse infrastructure 1306. The data warehouse infrastructure 1306 may provide data summarization, query, and analysis. In some embodiments, the data warehouse infrastructure 1306 may be provided by an Apache Hive instance, although other embodiments may rely on other mechanisms to provide access to the table of login information. The information may be processed, encrypted, and stored in a remote storage system 1308 like an S3 bucket, referring to the Amazon Simple Storage Service (S3) cloud storage service provided by Amazon Web Services of Seattle, Wash. Other remote storage systems may be used in other embodiments. A cluster-computing job may be configured and performed by a workflow orchestration and scheduling framework, like the Meson workflow framework produced by Netflix, Inc. of Los Gatos, Calif. The job may be a Spark job, in some embodiments, and may be configured to run on a schedule such as once daily. The associated job may be run more or less often in various embodiments. When the job is completed, the workflow framework may cause the output of the job to be loaded into the cache 1300 as the user access information 1302A. The workflow may also store the information as user access information 1302B in the remote storage system 1308. When the access determination system 1034 submits a query for information associated with the user, the query may use an identifier of the user, such as the user's email address or the user's username. In this way, a certain period of data associated with the user may be accessed to determine whether or not the user has accessed the application, currently being requested, within the period of time. The data warehouse infrastructure 1306 may be configured to include login information for a specified period only, deleting any information having a date outside of the specified period. As noted herein, the specified period may be individualized on a per application basis or a per user basis.

Figure 14:
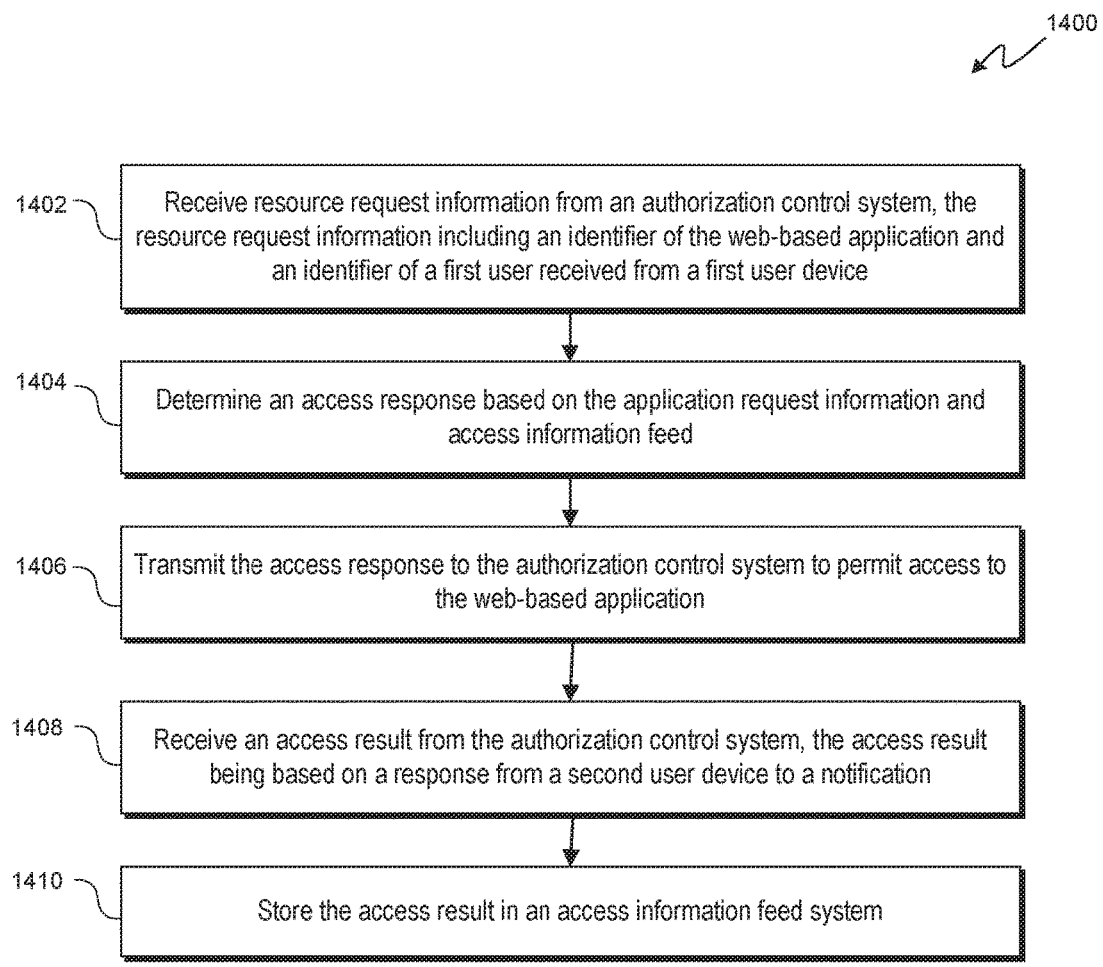
FIG. 14 is a flowchart illustrating a method of securing applications in a distributed computing environment, according to some aspects of the present disclosure.

Referring now to FIG. 14, shown therein is a flowchart of a method 1400 for securing user access to applications in a distributed computing environment, like the environment 1000 of FIG. 10. Embodiments of the method 1400 may include additional steps or operations in between, before, after, or as part of the enumerated operations shown in FIG. 14. Additionally, some embodiments of the method 1400 may omit one or more of the enumerated operations. Some embodiments of the method 1400 may be executable instructions stored on a non-transitory, tangible medium that may be read by a computer or processor thereof to perform the operations of the method.

As illustrated, the method 1400 may begin an operation 1402 when a processor of an access determination system receives application request information from an authorization control system. The application request information may include an identifier of a first web-based application and an identifier of a first user. For example, the access determination system 1034 may receive a request from the authorization control system 1030 to determine how to respond to a request from the first user to access the protected application 1004. The request may include resource request information that includes an identifier of the application 1004 and an identifier of the user 1020 and/or the first user device 1010A. For example, identifiers may include a username, an application name, a device identifier, and/or IP addresses associated with the first user device 1010A and the remote resource 1002.

At operation 1404, the processor determines an access response based on the application request information and access information feed. For example, the access determination system 1034 may receive a username of the user 1020 and identifier of the application 1004. In some embodiments, the access determination system 1034 may also receive an IP address associated with the user device issuing the request, which may be the first user device 1010A. As described herein, the access determination system 1034 may query an access feed storage system 1036 (shown in FIGS. 1 and 13) to retrieve access feed information associated with the user 1020. The access determination system 1034 may determine, from the access feed information, the last time that the user 1020 access the application 1004. Based on a determination of whether the last time of access was within a predetermined time period during which access to the application 1004 by the user 1020 has been monitored. The predetermined time period may vary depending on the application and/or the user. For example, when the user 1020 is a contractor of an organization rather than an employee of the organization, the predetermined time period may be shorter, such as a 30 day time period for a contractor and a 90 day time period for an employee. The access response may be to allow access to the first web-based application, to allow access to the first web-based application when the response from the second user device to the notification is a conforming response, or to deny access to the first web-based application.

At operation 1406, the processor transmits the access response to the authorization control system. For example, the access determination system 1034 may respond to the authorization control system 1030 by transmitting the determined access response as determined based on information associated with the user 1020 and the access feed information accessible to the access determination system 1034.

At operation 1408, the processor receives an access result from the authorization control system. The access result may be based on a response from a second user device to a notification. For example, the access determination system 1034 may receive an indication of the result of the access response provided previously to the authorization control system 1030 by the access determination system 1034. The result may indicate that the user of a second user device 1010B has provided a confirming response to a push notification sent by a notification system 1040. In some instances, the result may indicate that the user of the second user device 1010B has provided an indication that access was not requested by the user 122 the application 1004. This may indicate that the first user device 1010A is being used by an authorized user, e.g., a user other than the user 1020. In some instances, the authorization control system 1030 may deny access to the application 1004 even when a confirming response to a push notification has been received. For example, access may be denied to the first user device 1010A when an IP address associated with the first user device 1010A indicates that the user 1020 (or at least the user device 1010A) is in an area that is to be denied access or is outside a specified area in which access is permitted.

At operation 1410, the processor stores the access result in an access information feed system. For example, the access determination system 1034 may communicate with the cache 1300, the cluster computing infrastructure 1304, the data warehouse infrastructure 1306 and/or the remote storage system 1308, to store the access result in a set of user access information, such as the user access information 1302A or 1302B. In this way, the access result may be stored for later access to determine whether a subsequent request by the user device 1010A for access to the protected application 1004 should be granted. In some embodiments, this access result may be logged in a different manner. For example, the application 1004 and/or the remote resource 1002 may be programmed to communicate successful logins and or unsuccessful logins to the access determination system 1034 or to a component of the access feed storage system 1036, directly.

As described herein, the operations are performed by a processor. This processor may be one or more processors, such as one or more processors of the access determination system 1034. As noted, additional or alternative operations may be included in different embodiments of the method 1400.

Figure 15:
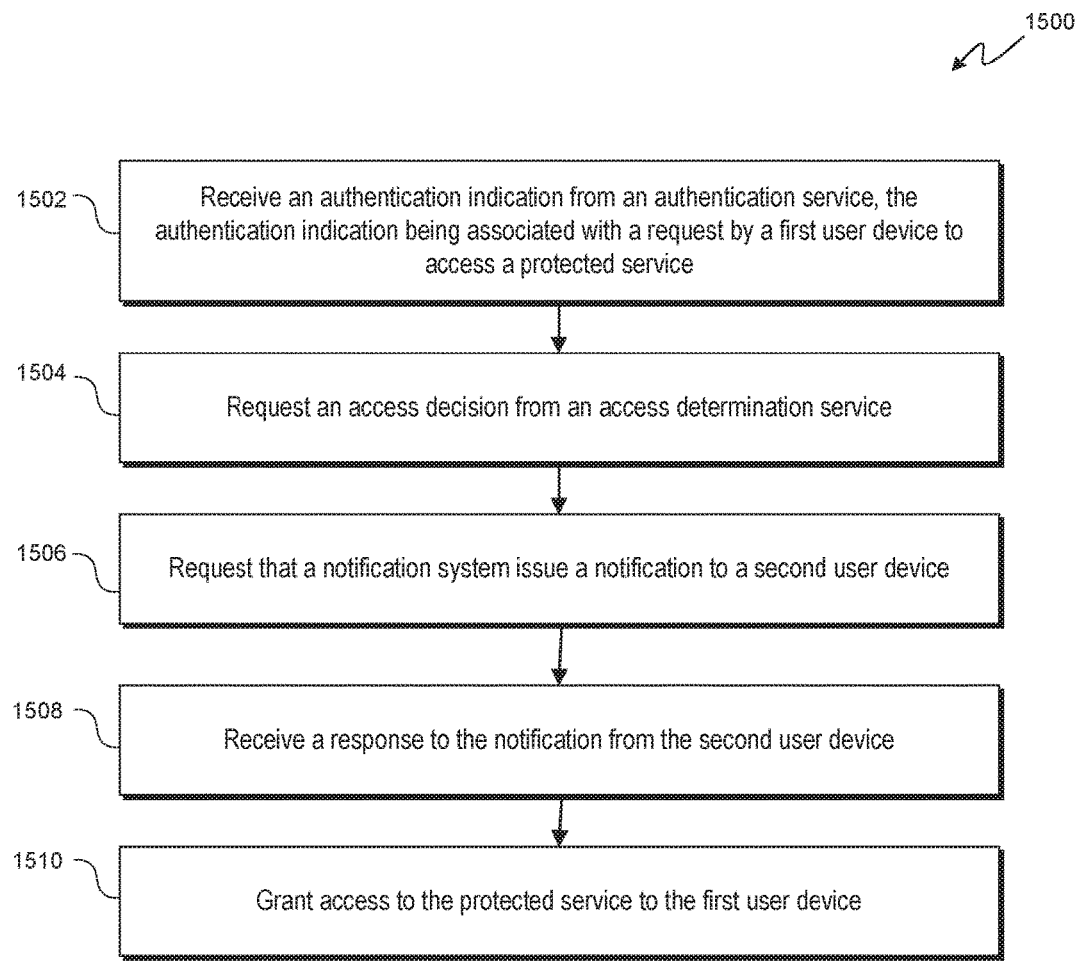
FIG. 15 is a flowchart illustrating another method of securing applications in a distributed computing environment, according to some aspects of the present disclosure.

Referring now to FIG. 15, shown therein is a flowchart of another method, method 1500, securing user access to applications in a distributed computing environment. Embodiments of the method 1500 may include additional steps or operations in between, before, after, or as part of the enumerated operations shown in FIG. 15. Additionally, some embodiments of the method 1500 may omit one or more of the enumerated operations. Some embodiments of the method 1500 may be executable instructions stored on a non-transitory, tangible medium that may be read by a computer or processor thereof to perform the operations of the method.

Some embodiments of the method 1500 may begin at operation 1502 when a processor receives an authentication indication from an authentication service. The authentication indication may be associated with a request by a first user device to access a protected service. For example, the authorization control system 1030 may receive an indication from the authentication system 1032 of FIG. 10, that the user 1020 has authenticated the first user device 1010A to the authentication system. For example, the first user device 1010A may be used to provide a username, which may be an email address or another identifier, a password, and a one-time passcode, for a multifactor authentication scheme. Other embodiments may use fewer factors or different factors in authenticating the user of the first user device 1010A. The authentication system 1032 may be used as a single sign-on service by which the first user device 1010A may gain access to remote resources 1002 and applications 1004. However, the authorization control system 1030 may limit access even when the user of the first user device 1010A has been authenticated by the authentication system 1032.

At operation 1504, when the authentication indication indicates successful authentication, the processor requests an access decision from an access determination service. As noted, even when a user has successfully authenticated the first user device 1010A with the authentication system 1032, the authorization control system 1030 may deny access to a particular application depending on when the first user device 1010A, or a user 1020 identified by a username and other credentials, last accessed the particular application. As described in connection with the method 1400 of FIG. 14, the authorization control system 1030 may query the access determination system 1034 to request an access response indicating whether the user device 1010A may be granted access to the application 1004 without a confirming response to a push notification or only with a confirming response or be denied access to the application due to a negative response, a lack of a timely response, or despite a confirming response. In some embodiments, the access determination system may report the last time the user 1020 or the user device 1010A access the application 1004 and the authorization control system may make the determination of whether a confirming response to a push notification sent to the second user device 1010B should be received before access to the application 1004 is granted.

After determining whether additional information should be collected from the user 1020 before granting access to the application 1004 to the first user device 1010A, the processor requests that a notification system issue a notification to a second user device, at operation 1506. For example, the authorization control system 1030 may communicate with the notification system 1040 to request that the notification system 1040 send a notification, such as a push notification to a second user device 1010B that is associated with the user 1020. The authorization control system 1030 may include in the request, and identifier of the user 1020 and/or the first user device 1010A that can be associated by the push notification system 1040 with the second user device 1010B. The authorization control system 1030 may also include an identifier of the application 1004 so that the notification system 1040 may notify the second user device 1010B of the application to which access has been requested. In some embodiments, the authorization control system 1030 or the access determination system 1034 may include a table associating the user 1020, the first user device 1010A, and the second user device 1010B, such that the authorization control system 1030 may provide an identifier of the second user device 1010B to the notification system 1040.

At operation 1508, the processor receives a response to the notification from the second user device. For example, the authorization control system 1030 may receive a response to the notification via the notification system 1040. As described in connection with FIG. 12, the second user device 1010B may be a smart phone like the smart phone 1200. The user 1020 may select a user interface element to either confirm or deny that the user 1020 requested access to the application 1004. In some embodiments, the notification system 1040 may be programmed to respond with a negative response in the event that no response is received from the second user device 1010B within a predetermined time period. In some other responses, the authorization control system 1030 may be programmed to generate a negative response or a timed out response in the event that no response is received from the second user device 1010B.

At operation 1510, the processor grants access to the protected service to the first user device, after and in response to receipt of a confirming response has been received from the second user device. For example, the authorization control system 1030 may redirect or direct the interface 1012A of the first user device 1010A to the application 1004, after the authorization control system 1030 receives a confirming response from the second user device 1010B.

Embodiments of the present disclosure may provide a layer of protection to prevent unauthorized access to protect applications in the event that a bad actor has one device that has already been authorized with respect to some applications, like a logged-in computer left open for a moment in a library or a coffee shop. In this way, embodiments of the present disclosure may improve the security of distributed computing environments, such as an enterprise network having tens or hundreds of applications accessible to employees once they are logged in to the network.

Certain aspects of the present disclosure are set out the new following numbered clauses:

1. An application access system comprising: an access determination server having a processing device in communication with one or more additional networked systems; an authorization control system being included in the one or more additional networked systems; a first web-based application accessible over a network to a first user device of a first user; and wherein the processing device of the access determination server: receives application request information from the authorization control system, the application request information including an identifier of the first web-based application and an identifier of the first user, determines an access response based on the application request information and access information feed; transmits the access response to the authorization control system; receives an access result from the authorization control system, the access result being based on a response from a second user device to a notification; and stores the access result in an access information feed system.

2. The application access system of clause 1, wherein the access determination system includes a local store of previous access results.

3. The application access system of any of clauses 1-2, wherein the access determination system communicates with a remote database system to access a remote store of previous access results.

4. The application access system of any of clauses 1-3, wherein the access response is one of: allowing access to the first web-based application; allowing access to the first web-based application when the response from the second user device to the notification is a conforming response; and denying access to the first web-based application.

5. The application access system of any of clauses 1-4, wherein the conforming response is an affirmative response and is received within a predetermined time.

6. The application access system of any of clauses 1-5, wherein the authorization control system implements the access response transmitted from the access determination system.

7. The application access system of any of clauses 1-6, wherein the authorization control system interfaces with a single sign-on service to control access to the first web-based application over the network by the first user device.

7.1 A non-transitory computer-readable storage medium storing instructions that, when executed by one or more processing devices, cause the processing devices to perform any of the features recited in any of clauses 1-7.

7.2. A method that, when implemented by one or more processing devices, performs operations providing any of the features recited in any of clauses 1-7.

8. A computer-implemented method of controlling access to a web-based application, the method comprising: receiving resource request information from an authorization control system, the resource request information including an identifier of the web-based application and an identifier of a first user received from a first user device, determining an access response based on the application request information and access information feed, wherein the access response is to allow access, by the authorization control system, to the web-based application based on a response from a second user device to a notification; and transmitting the access response to the authorization control system to permit access to the web-based application.

9. The method of clause 8, further comprising: receiving an access result from the authorization control system, the access result being based on the response from the second user device to the notification; and storing the access result in an access information feed system.

10. The method of any of clauses 8-9, wherein storing the access result in the access information feed system comprises storing the access result in a local cache.

11. The method of any of clauses 8-10, wherein the access information feed system includes the local cache and includes remotely stored access information in a remote storage system.

12. The method of any of clauses 8-11, further comprising comparing information in the local cache with information in the remote storage system to determine the access response.

13. The method of any of clauses 8-12, further comprising determining that the first user device does not have an authorized session when the resource request information is received from the authorization control system.

14. The method of any of clauses 8-13, wherein the response from the second user device to the notification is an affirmative response and is received by the authorization control system from the second user device within a predetermined time.

15. The method of any of clauses 8-14, wherein the resource request information includes an Internet protocol (IP) address associated with the first user device and wherein the access response is further based on the IP address.

16. The method of claim any of clauses 8-15, wherein the access information feed comprises a table of access information and collected over a predetermined period.

17. The method of any of clauses 8-16, wherein the table of access information comprises successful login information associated with the first user for a plurality of web-based applications and times at which the web-based applications were last accessed.

17.1 A non-transitory computer-readable storage medium storing instructions that, when executed by one or more processing devices, cause the processing devices to perform any of the features recited in any of clauses 8-17.

17.2 A system configured to perform the operations described by the features recited in any of clauses 8-17.

18. A computer-implemented method for determining an access response to provide to a first user device requesting access to a first web-based application over a network, the method comprising: receiving an authentication indication from an authentication service, the authentication indication being associated with a request by a first user device to access a protected service; when the authentication indication indicates successful authentication, requesting an access decision from an access determination service; requesting that a notification system issue a notification to a second user device; receiving a response to the notification from the second user device; and granting access to the protected service to the first user device.

19. The method of clause 18, wherein the notification is a push notification and wherein a type of the second user device is different than a type of the first user device.

20. The method of any of clauses 18-19, wherein the authentication service is a third-party authentication service requiring a multi-factor interaction for authentication.

20.1 A non-transitory computer-readable storage medium storing instructions that, when executed by one or more processing devices, cause the processing devices to perform any of the features recited in any of clauses 18-20.

20.2 A system configured to perform the operations described by the features recited in any of clauses 18-20.

Although the foregoing aspects of the present disclosure have been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. An application access system comprising:
an access determination server having a memory and a processor in communication with one or more additional networked systems;
an authorization control system being included in the one or more additional networked systems; and
a first web-based application accessible over a network to a first user device of a first user; and
wherein the processor of the access determination server:
receives application request information from the authorization control system, the application request information including an identifier of the first web-based application and an identifier of the first user,
determines an access response based on the application request information and based on an entry in an access information feed, the access information feed comprising a list of attempts by the first user to access the first web-based application, the entry in the access information feed comprising an indication of when a most recent attempt to access the first web-based application was initiated by the first user;
determining that the amount of time since the most recent attempt to access the first web-based application is longer than a specified threshold time;
based on the determination, transmits the access response to the authorization control system, the access response indicating that, because the first web-based application was not accessed by the first user for longer than the specified threshold time, a notification is to be sent to a second user device of the first user;

receives an access result from the authorization control system, the access result being based on a response from the second user device to the notification; and stores the access result in an access information feed system.

2. The application access system of claim 1, wherein the access determination system includes the local store of previous access results.

3. The application access system of claim 1, wherein the access determination system communicates with the remote storage system to access a remote store of previous access results.

4. The application access system of claim 1, wherein the access response is one of:

allowing access to the first web-based application;

allowing access to the first web-based application when the response from the second user device to the notification is a conforming response; and denying access to the first web-based application.

5. The application access system of claim 4, wherein the conforming response is an affirmative response and is received within a predetermined time.

6. The application access system of claim 4, wherein the authorization control system implements the access response transmitted from the access determination system.

7. The application access system of claim 1, wherein the authorization control system interfaces with a single sign-on service to control access to the first web-based application over the network by the first user device.

8. A computer-implemented method of controlling access to a web-based application, the method comprising:

receiving resource request information from an authorization control system, the resource request information including an identifier of the web-based application and an identifier of a first user received from a first user device, determining an access response based on the application request information and based on an entry in an access information feed, the access information feed comprising a list of attempts by the first user to access the first web-based application, the entry in the access information feed comprising an indication of when a most recent attempt to access the first web-based application was initiated by the first user;

determining that the amount of time since the most recent attempt to access the first web-based application is longer than a specified threshold time;

based on the determination, transmitting the access response to the authorization control system, the access response indicating that, because the first web-based application was not accessed by the first user for longer than the specified threshold time, a notification is to be sent to a second user device of the first user;

receiving an access result from the authorization control system, the access result being based on a response from the second user device to the notification; and storing the access result in an access information feed system.

9. The method of claim 8, further comprising:

receiving an access result from the authorization control system, the access result being based on the response from the second user device to the notification; and storing the access result in an access information feed system.

10. The method of claim 9, wherein storing the access result in the access information feed system comprises storing the access result in the local cache.

11. The method of claim 10, wherein the access information feed system includes the local cache and includes remotely stored access information in a remote storage system.

12. The method of claim 8, further comprising determining that the first user device does not have an authorized session when the resource request information is received from the authorization control system.

13. The method of claim 8, wherein the response from the second user device to the notification is an affirmative response and is received by the authorization control system from the second user device within a predetermined time.

14. The method of claim 8, wherein the resource request information includes an Internet protocol (IP) address associated with the first user device and wherein the access response is further based on the IP address.

15. The method of claim 8, wherein the access information feed comprises a table of access information and collected over a predetermined period.

16. The method of claim 15, wherein the table of access information comprises successful login information associated with the first user for a plurality of web-based applications and times at which the web-based applications were last accessed.

17. A computer-implemented method for determining an access response to provide to a first user device requesting access to a first web-based application over a network, the method comprising:

receiving an authentication indication from an authentication service, the authentication indication being associated with a request by a first user device to access a protected service, the authentication indication being based on the request and an entry in an access information feed, the entry in the access information feed comprising a previously granted access for the first user device;

when the authentication indication indicates successful authentication, requesting an access decision from an access determination service, the access determination service being configured to determine whether the amount of time since a most recent attempt to access the protected service is longer than a specified threshold time;

upon determining that the protected service was not accessed by the first user device for longer than the specified threshold time, requesting that a notification system issue a notification to a second user device to perform a second authentication using the second user device;

receiving a response to the notification from the second user device; and granting access to the protected service to the first user device.

18. The method of claim 17, wherein the notification is a push notification and wherein a type of the second user device is different than a type of the first user device.

19. The method of claim 17, wherein the authentication service is a third party authentication service requiring a multi-factor interaction for authentication.

* * * * *